United States Patent [19]
Yamamoto

[11] Patent Number: 5,856,830
[45] Date of Patent: Jan. 5, 1999

[54] ANIMATION DISPLAY PROCESSOR

[75] Inventor: Rieko Yamamoto, Kawasaki, Japan

[73] Assignee: Fujitsu Limited, Kawasaki, Japan

[21] Appl. No.: 427,729

[22] Filed: Apr. 24, 1995

Related U.S. Application Data

[63] Continuation of Ser. No. 827,989, Jan. 29, 1992, abandoned.

[30] Foreign Application Priority Data

Jan. 29, 1991 [JP] Japan .................................. 3-028054

[51] Int. Cl.$^6$ ................................................ G06T 13/00
[52] U.S. Cl. ............................................................. 345/474
[58] Field of Search .................................... 395/152, 173, 395/949; 345/119, 122, 125, 116, 473–474, 302

[56] References Cited

U.S. PATENT DOCUMENTS

| | | | |
|---|---|---|---|
| 4,952,051 | 8/1990 | Lovell et al. | 352/87 |
| 4,954,819 | 9/1990 | Watkins | 345/340 |
| 5,097,411 | 3/1992 | Doyle et al. | 345/522 |
| 5,111,409 | 5/1992 | Gasper et al. | 345/302 |
| 5,148,154 | 9/1992 | MacKay et al. | 345/340 |
| 5,213,555 | 5/1993 | Hood et al. | 482/57 |
| 5,237,648 | 8/1993 | Mills et al. | 345/433 |
| 5,251,322 | 10/1993 | Doyle et al. | 345/501 |
| 5,261,041 | 11/1993 | Susman | 345/473 |
| 5,307,295 | 4/1994 | Taylor et al. | 364/578 |
| 5,396,587 | 3/1995 | Reed et al. | 707/503 |
| 5,398,313 | 3/1995 | Kojima et al. | 395/702 |
| 5,479,602 | 12/1995 | Baecker et al. | 345/349 |
| 5,517,663 | 5/1996 | Kanh | 345/473 |
| 5,519,826 | 5/1996 | Harper et al. | 345/473 |
| 5,533,181 | 7/1996 | Bergsneider | 345/473 |
| 5,594,910 | 1/1997 | Filepp et al. | 395/800.28 |

OTHER PUBLICATIONS

Foley et al., Computer Graphics: Principle and Practice, pp. 1070–1077, 1990.

Adams et al., Computer Assisted Surgery, Computer Graphics & Applications, pp. 43–51, May 1990.

Breen et al., Object Oriented Programming in a Conventional Programming Environment, Computer Software and Applications Conference, pp. 334–343, Sep. 1989.

Heath et al., Visualizing the Performance of Parallel Programs, IEEE Software, pp. 29–39, Sep. 1991.

Publication: A Visual Programming Language for Interactive Graphics by Paul E. Haeberli, Computer Graphics vol. 22, No. 4 Aug. 88.

The Best Book of Word Perfect Ver 5.0 by Vincent Alfieri, Hayden Books 1988.

Publication: Macuser, Sep. 89, "Presentations with Punch!", Parascandolo et al. pp. 93, 94, 95, 98, 100, 102, 104, 109, 113 and 117.

Publication: Computer Graphics, Aug. 88, Con Man: A Visual Programming Language for Interactive Graphics, Haeberli, pp. 103–111.

IBM Technical Disclosure Bulletin, vol. 32, No. 10B, Mar. 1990, Armonk, NY, pp. 438–440 'Operator Interface for the Creation of Animation Sequences'.

IEEE Workshop on Visual Languages, Oct. 1989, Rome, pp. 68–73, Tonomura et al., 'Content Oriented Visual Interface Using Video Icons for Visual Database Systems'.

*Primary Examiner*—Anton Fetting
*Attorney, Agent, or Firm*—Staas & Halsey

[57] ABSTRACT

The animation display controller to interpret a scenario description managed by a scenario description manager. According to the interpretation, it reads an animation display unit from an animation display unit manager and displays time series data of animation display units through a plurality of windows opened on a display. As a result, related animation images are displayed on the display in the multiple window format. The animation display controller also performs a backward process of animation display units included in transit-in-time-series at a user's request according to managing data input unit, a user can edit an animation display unit managed by the animation display unit manager and a scenario description managed by the scenario description manager. Specifically, the scenario description editor graphically edits scenario descriptions.

13 Claims, 37 Drawing Sheets

```
frame
arc0   arc 320 200 100   0 360
arc1   arc 320 200 100  45 180
cirl   circle 400 300 20
box1   box 350 100  40 40
box1_orig box350 100 40 40
4   s3 string120 360 "FONT OF TE S   CEARACT RS IS a16" 2 1
a1 arrow 0 0 100 100
frame
box1 350  50
s3   120 400
a2 arrow 200 120 100 100
```

FIG 3

```
# EXPLANATION OF GENERAL DESCRIPTION
glueOpen     stage1   640 600 100 100
glue glue11  stage1   directory1/explanation1
glue glue12  stage1   directory1/explanation2
glue glue13  stage1   directory1/explanation3
glue glue14  stage1   directory1/explanation4
# DRAWING FOR REALIZATION
glue glue15  stage1   directory2/structure0
glue glue16  stage1   directory3/structure1
glue glue17  stage1   directory3/structure2
glue glue18  stage1   directory3/structure4
glueClose    stage1
# OUTPUT SAMPLE
glueOpen     stage2   640 400 800 100
glue glue21  stage2   directory1/example1
glue glue22  stage2   directory1/example2
glue glue23  stage2   directory1/example3
# EXPLANATION FOR REALIZATION
glue glue24  stage2   directory3/implementation1
glue glue25  stage2   directory3/implementation2
glue glue26  stage2   directory3/implementation3
glue glue27  stage2   directory3/implementation4
glue glue28  stage2   directory3/implementation5
glue glue29  stage2   directory3/implementation6
glueClose    stage2
```

FIG. 7

```
# SOURCE FILE
glueopen    stage3  640 400 800 100
glue glue51 stage3  directory3/examplefile
glueclose   stage3
# SYNCHRONIZATION
gluesync    glue12 glue21
gluesync    glue13 glue22
gluesync    glue14 glue23
gluesync    glue15 glue24
gluesync    glue16 glue25
gluesync    glue17 glue26
gluesync    glue18 glue27
gluesync    glue25 glue51
```

FIG. 8

"man" DISPLAYS INFORMATION FROM THE REFERENCE MANUAL IN THE COMPUTER.

"man" SEQUENTIALLY DISPLAYS ALL PAGES OF A MANUAL SPECIFIED BY TITLE USING A COMMAND.

FIG. 15

"man" DISPLAYS INFORMATION FROM THE REFERENCE MANUAL IN THE COMPUTER.

"man" SEQUENTIALLY DISPLAYS ALL PAGES OF A MANUAL SPECIFIED BY TITLE USING A COMMAND.

FOR EXAMPLE, A REFERENCE MANUAL OF THE COMMAND "man" IS DISPLAYED AS FOLLOWS. ⟶

FIG. 16

```
MAN (1)                USER COMMANDS                  MAN (1)

NAME
  man-display reference manual pages; find reference pages by keyword

SYNOPSIS
  man [-] [-t] [-M path ] [-T macropackage ] [ [section ] title
  . . . ] . . .
  man [-M path ] -k keyword. . .
  man [-M path ] -f filename. . .

DESCRIPTION
      man displays information from the reference manuals. It can
      display complete manual pages that you select by title, or
      one-line summaries selected either by keyword (-k), or by
      the name of an associated file (-f).
```

FIG. 17

THIS FILE CAN BE EDITED IN THE SPECIFIED
FORMAT BY THE APPROPRIATE FORMATTER.

FIG. 19

```
.\"  COPYRIGHT NOTICE FOR CURRENTLY EXECUTED SOFTWARE
.\"  All rights reserved.
.\"
.\"
.\"  s (H)man.1 1. 32 88/03/04 SM1; form UCB 6. 2 8/7/85
.TH man 1 " 12 January 1988"
.SH NAME
man \-display reference manual pages; find reference pages by keyword
.SH SYNOPSIS
.B man
.RB" [\f" \-" \ | ]"
.RB" [\f" \-t" \ | ]"
.RB" [\f"\-H
.IR path" \| ]"
.RB" [\f"\-T
.IR macro-package" \| ]"
.RI " [\| [\f" section " \| ] " title " .\|. \|. \|. ]. \|. \f"
.br
.B man
.RB" [\f" \-M
```

FIG. 20

WHEN −t IS OPTIONALLY SPECIFIED, DATA ARE OUTPUTTED TO A PRINTER, NOT ON A SCREEN.

FIG. 22

FIRST CONTENTS
glueOpen     stage0    640 600 100 100  
glue menu    stage0    directory1/menu  
gluebranch from box 1 in menu to outline  
gluebranch from box 2 in menu to implementation    (i)  
gluebranch from box 3 in menu to detail

EXPLANATION OF GENERAL DESCRIPTION
glueOpen     stage1    640 600 100 100  
glue glue11   stage1    directory1/explanation1  
glue glue12   stage1    directory1/explanation2  
glue glue13   stage1    directory1/explanation3  
gluebranch    from box1 in glue13 to glue24      (ii)

glue glue14   stage1    directory1/explanation4  
gluebranch    from glue14 to glue11      (iii)  
glroup outline with glue11 glue12 glue13 glue14      (a)

OUTPUT SAMPLE
glueOpen     stage2    640 400 800 100  
glue glue21   stage2    directory1/example1  
glue glue22   stage2    directory1/example2  
glue glue23   stage2    directory1/example3

FIG. 24

EXPLANATION FOR REALIZATION
glue glue24   stage2   directory2/implementation1
glue glue25   stage2   directory2/implementation2
glue glue26   stage2   directory2/implementation3
glue glue27   stage2   directory2/implementation4
glue glue28   stage2   directory2/implementation5
glue glue29   stage2   directory2/implementation6  -- (b)
glueClose     stage2
group implementation glue24 glue25 glue26 glue27 glue28 glue29

DETAIL EXPLANATION
glueOpen    stage5   640 600 100 100
glue glue51   stage5   directory1/detail1
glue glue52   stage5   directory1/detail2
glue glue53   stage5   directory1/detail3
gluebranch  from     glue53 to glue51                        (iv)
group detail with    glue51 glue52 glue53                    (c)

SYNCHRONIZATION
glueSync    glue12 glue21
glueSync    glue13 glue22
glueSync    glue14 glue23

FIG. 25

ANIMATION DISPLAY PROCESSOR

This application is a continuation of application Ser. No. 07/827,989, filed Jan. 29, 1992, now abandoned.

BACKGROUND OF THE INVENTION

The present invention relates to an animation display processor for displaying animation through a plurality of windows on a display.

Recently, many technologies for displaying animation on a display of a workstation, etc. have been developed.

Among the prior art technologies of such animation display processes, the most popular method is to generate an image as a bit map, etc. on a screen in a time series based on a predetermined time unit and to sequentially display generated images on a display. In this case, the animation is displayed independently through each window on the display.

Another technology for the animation display process is described as follows: First, the state of a screen at a predetermined time is somehow expressed in terms of data. Then, the state of a screen at a later time is likewise expressed in terms of data. These two blocks of data are used to calculate the data expressing a screen state at any time point between the above two time points. Thus, the obtained screen state at each time is sequentially displayed on a display, thereby displaying animation on the display. In this case, the animation can also be displayed independently through each window on the display.

In the above described prior art technologies, since related animation cannot be simultaneously shown on a display, there is a problem in that the utilization of animation at a workstation, etc. is necessarily limited. For example, when an operational explanation of a software of a computer system is displayed, it is assumed to be easily explained if the explanatory sentences and the corresponding animation can be synchronously displayed. However, a synchronous operation cannot be performed by the above described prior art technologies for independently displaying animation through each window.

Besides, in the animation display process of the prior art technologies, animation is displayed in series on a display as if a roll of film were being driven. Therefore, both the content of the animation display and the utilization of animation at a workstation, etc. are large extent. For example, suppose that an operational explanation of a software of a computer system is desired to be displayed on a screen with the animation. In this case, the above described synchronous operation can never be performed because the content of the animation cannot be dynamically modified when a detailed explanation must be added to a user-specified explanatory representation.

In the animation display process of the prior art technologies, animation is collectively managed and displayed as in a film operation. Therefore, the animation data must be properly edited after the required data are extracted from a large volume of data so that a part of the content of the animation may be modified, thus causing trouble to an operator.

SUMMARY OF THE INVENTION

The present invention has been developed based on the above described background to display a series of animation images through a plurality of windows.

The present invention comprises an animation display unit manager, a scenario description manager, an animation display controller and a scenario description editor. The animation display unit manager is for managing a plurality of animation display units each comprising one or more frames for describing a screen display definition. The scenario description manager is for managing a scenario description indicating the state of each window on a display, the sequence of animation display units in a time series displayed through each window, and the synchronization among animation display units displayed through each window. The animation display controller is for interpreting the scenario description managed by the scenario description manager and sequentially displaying according to the interpretation the above described time series data of animation display units. The scenario description editor is for allowing a user to edit the scenario description managed by the scenario description manager in an editing operation including a graphic symbol editing process.

In the above described configuration, a plurality of animation screens can be displayed through synchronously operated windows forming a multiple-window configuration, thereby making an explanation understood so easily.

Additionally, the present invention can allow various descriptions to be represented much more freely than the prior art technologies by associating an animation image with another in a smaller animation display unit spatially and in a time series and by associating these images with each window. Besides, the animation can be reused as "parts" by segmenting a series of animation into a number of segments, thus easily editing long-time animation and greatly improving the efficiency in editing animation.

Additionally, as a scenario description can be graphically edited in the present invention, animation can be edited more easily.

BRIEF DESCRIPTION OF THE DRAWINGS

Other objects and features of the present invention can be easily recognized by referring to the attached drawings and the embodiments described in this specification.

FIG. 3 is a view for explaining an embodiment of the description format of the animation display unit;

FIGS. 7 and 8 are views for explaining an embodiment of a scenario description;

FIGS. 15–22 are views for explaining screen data to be displayed through windows;

FIGS. 24 and 25 are views for explaining an embodiment of a scenario description;

DESCRIPTION OF THE PREFERRED EMBODIMENTS

Explanation of the Principle

Figure 1:
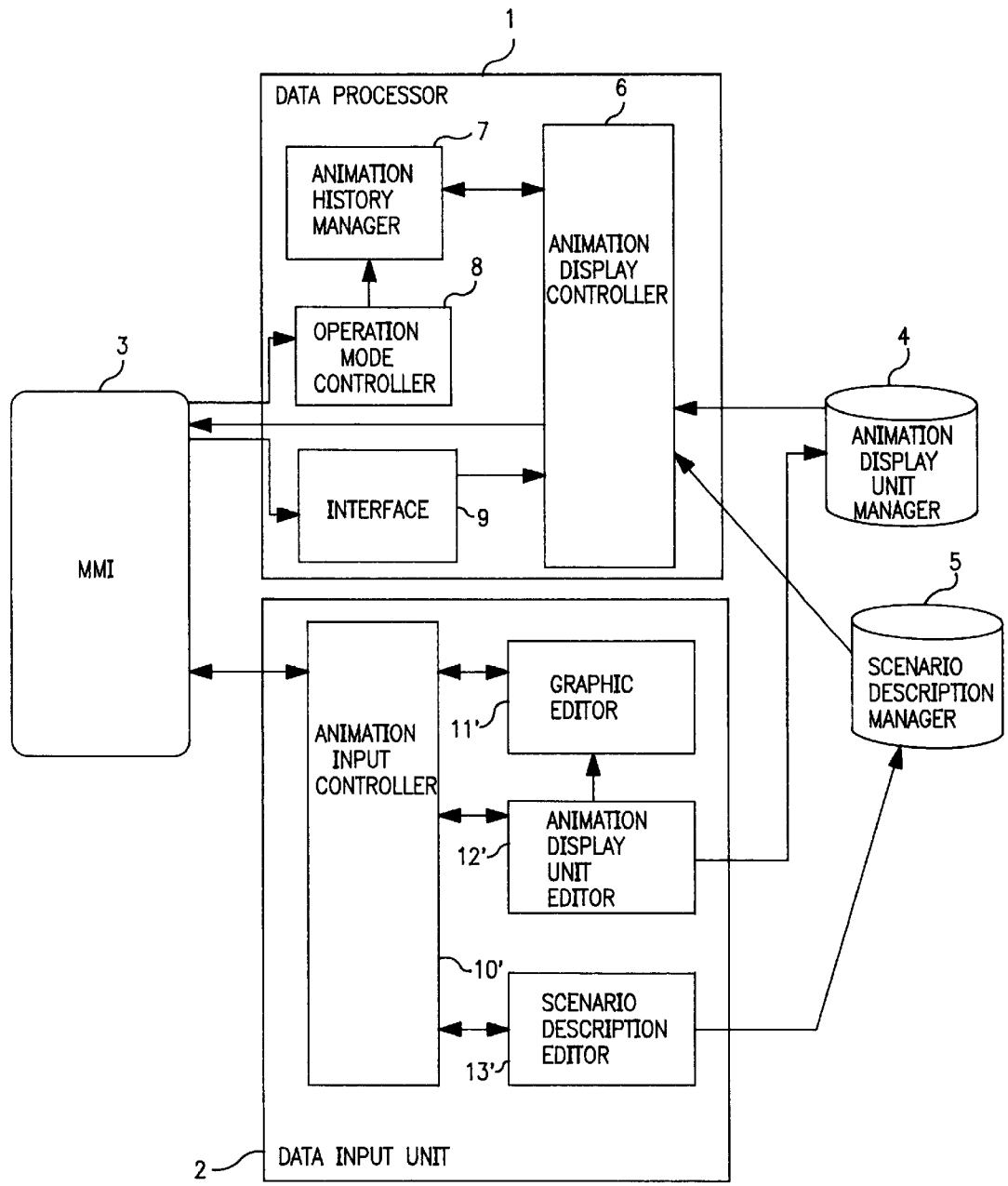
FIG. 1 shows the configuration of the principle of the present invention.

FIG. 1 is for explaining the principle of the present invention;

A Data processor 1 performs an animation display process. A data input unit 2 is used to input a scenario description for displaying animation. A man-machine interface (MMI) 3 is connected to the data processor 1 and data input unit 2.

The data processor 1 comprises an animation display unit manager 4 and a scenario description manager 5 each being realized by an auxiliary storage device, etc., an animation display controller 6, an animation history manager 7, an operation mode controller 8, and an interface 9.

The animation display unit manager 4 manages a plurality of animation display units each comprising one or more frames which describe a screen display definition. A frame forming each animation display unit is a data set describing each screen display definition for a predetermined display unit time. For example, the kind of figures shown on a display and the characteristic information of the figures are displayed with a graphic ID.

The scenario description manager 5 manages a scenario description of the state of each window on a display, such as the timing and the position of opening/closing a window, the sequence-in-time-series of animation display units displayed through each window, or the synchronization between animation display units displayed through each window. The above described sequence-in-time-series can be set to include the transition-in-time-series from an animation display unit to another animation display unit displayed through the same window as, or a different window from, the window through which the former unit is displayed. Besides, the above described transition-in-time-series can be set to include identification information which becomes valid when a predetermined screen portion in a currently displayed animation display unit is specified by a user.

Furthermore, the above described scenario description can be set to include group information indicating that a plurality of animation display unit groups are processed as an animation display unit.

The animation display controller 6 interprets the scenario description managed by the scenario description manager 5, according to which the time-series animation display unit data can be sequentially displayed through each window.

The animation history manager 7 manages the history of animation displayed in discretional transitional animation display units.

In response to the direction from the man-machine interface 3, the operation mode controller 8 controls the managing functions of the animation history manager 7 so that they are prevented from being performed.

In response to the instruction from the man-machine interface 3, the interface 9 controls the execution state of the animation display controller 6. That is, the interface 9 comprises such functions as a function of stopping the process of displaying animation, which is performed by animation display controller 6, a function of stepping forward or backward by one the stopped animation display unit by. controlling the animation display controller 6, and a function of stepping forward or backward by one unit a frame contained in the stopped animation display unit by controlling the animation display controller 6, etc.

Next, the data input unit comprises an animation input controller 10', a graphic editor 11', an animation display unit editor 12', and a scenario description editor 13'.

The animation input controller 10' controls the data input and output between the man-machine interface 3 and the graphic editor 11', animation display unit editor 12', or the scenario description editor 13'.

The graphic editor 11' is a general-purpose or exclusive graphic editor for allowing a user to edit in the graphic format a graphic definition of each frame in each animation display unit using the man-machine interface 3.

The animation display unit editor 12' groups, as an animation display unit, graphic definitions of each frame in each animation display unit which are edited by the user according to the instruction from the graphic editor 11', and the animation display units are stored in the animation display unit manager 4.

The scenario description editor 13' permits a user, through the man-machine interface 3, to edit a scenario description which is managed by the scenario description manager 5 in an editing process including a graphic symbol editing process.

That is, the scenario description editor 13' permits a user, through an editing window opened on the display during an editing operation, to edit in the text format a position of each window which is displaying animation, and also to edit in the graphic format using graphic symbols the sequence-in-time-series of animation display units displayed on each window and the synchronization among animation display units displayed on each window. Furthermore, the scenario description editor 13' can permit a user to edit through an editing window in the text format the display timing of an animation display unit displayed through each window which is currently displaying animation.

In addition to the above described animation display unit, the scenario description editor 13' permits a user to edit in the rectangular parallelepiped representation in which a display screen having editing windows is set in a three-dimensional figure in the time axis direction the open/close timing and position of each window which is displaying animation on the display. The scenario description editor 13' permits a user to edit in the text format through an editing window the open/close timing and position of each window which is displaying animation on the display, and also to edit the position of each window on a display by positioning each window within a predetermined area of the editing window.

In the present invention, the animation display unit manager 4 manages a plurality of animation display units each comprising one or more frames for describing a screen display definition. The scenario description manager 5 manages according to a scenario description the state of each window on a display, the sequence-in-time-series of animation display units displayed through each window, or the synchronization among animation display units displayed through each window. Then, as a result of these managing processes, the animation display controller 6 interprets the scenario description managed by the scenario description manager 5. According to the interpretation, related animation is displayed on a display by displaying time-series data in animation display units through a plurality of windows opened on the display.

Thus, in the present invention, related animation can be displayed on a display according to a multiwindow operation. Therefore, for example, an animation manual can be generated such that explanatory sentences and the corresponding animation for illustrating the operation can be outputted synchronously. Besides, since the animation to be displayed is managed in animation display units, the animation can be edited efficiently.

The animation display controller 6 can perform a control to dynamically change the content of displayed animation according to the time transit information when the sequence-in-time-series of animation display units described according to a scenario description includes the time transit information from an animation display unit to another animation display unit which is displayed through the same or a different window from that of the former animation display unit, and includes identification information which becomes valid when a user specifies a specific screen portion currently displaying an animation display unit.

Additionally, the animation display controller 6 can step the animation on a display forward or backward in a group of animation display units when a scenario description includes group information in which a group comprising a plurality of animation display units is processed as an animation display unit.

The animation history manager 7 manages a history of animation displayed in animation display units of time transit data. At a user's request, the animation display controller 6 executes according to the managing data provided by the animation history manager 7 a backward display process on animation display units having the time transit data. Thereby, the time sequence can be processed backwards even though a scenario description including the time transit information pointing to other animation display units.

When the animation history manager 7 enters an active state, a large part of a memory is occupied to manage the animation. Therefore, the operation mode 8 performs a control not to operate the managing function of the animation history manager 7 during the operation if the user does not issue a request to process the sequence backwards when a scenario description includes time transit information to other animation display units, thereby reducing the waste of the memory capacity.

The animation display controller 6 stops the process flow of animation display according to the controlling operation of the interface 9, steps a stopped animation display unit forwards or backwards by one unit, or steps a frame having the stopped animation display unit forward or backward by one unit. Thus, the user can correctly check the animation appearing on a display.

The user can edit through the data input unit 2 an animation display unit managed by the animation display unit manager 4 and a scenario description managed by the scenario description manager 5.

Specifically, the scenario description editor 13' can graphically edit a scenario description.

That is, a user edits in the text format through an editing window the position of each window which is currently displaying animation. Then, the user edits in the graphic format using graphic symbols the sequence-in-time-series of animation display units displayed through each window or the synchronization among animation display units displayed through each window.

Additionally, when the display timing of animation display units displayed through each editing window which is currently displaying animation is edited in the text format, the user can generate a scenario description in which the display timing of each animation display unit displayed through each window is explicitly specified while the synchronization among animation display units is properly retained.

In addition to the above described edition of animation display units, a user can edit in the rectangular parallelepiped representation in which a display screen having editing windows is set in a three-dimensional figure in the time axis direction the open/close timing and position of each window which is displaying animation on the display. Besides, a user can edit in the text format through an editing window the open/close timing and position of each window which is displaying animation on the display, and also edit the position of each window on a display by positioning each window within a predetermined area of the editing window.

An Embodiment of the Animation Display Unit 10

Next, preferred embodiments of the present invention are described below.

Figure 2:
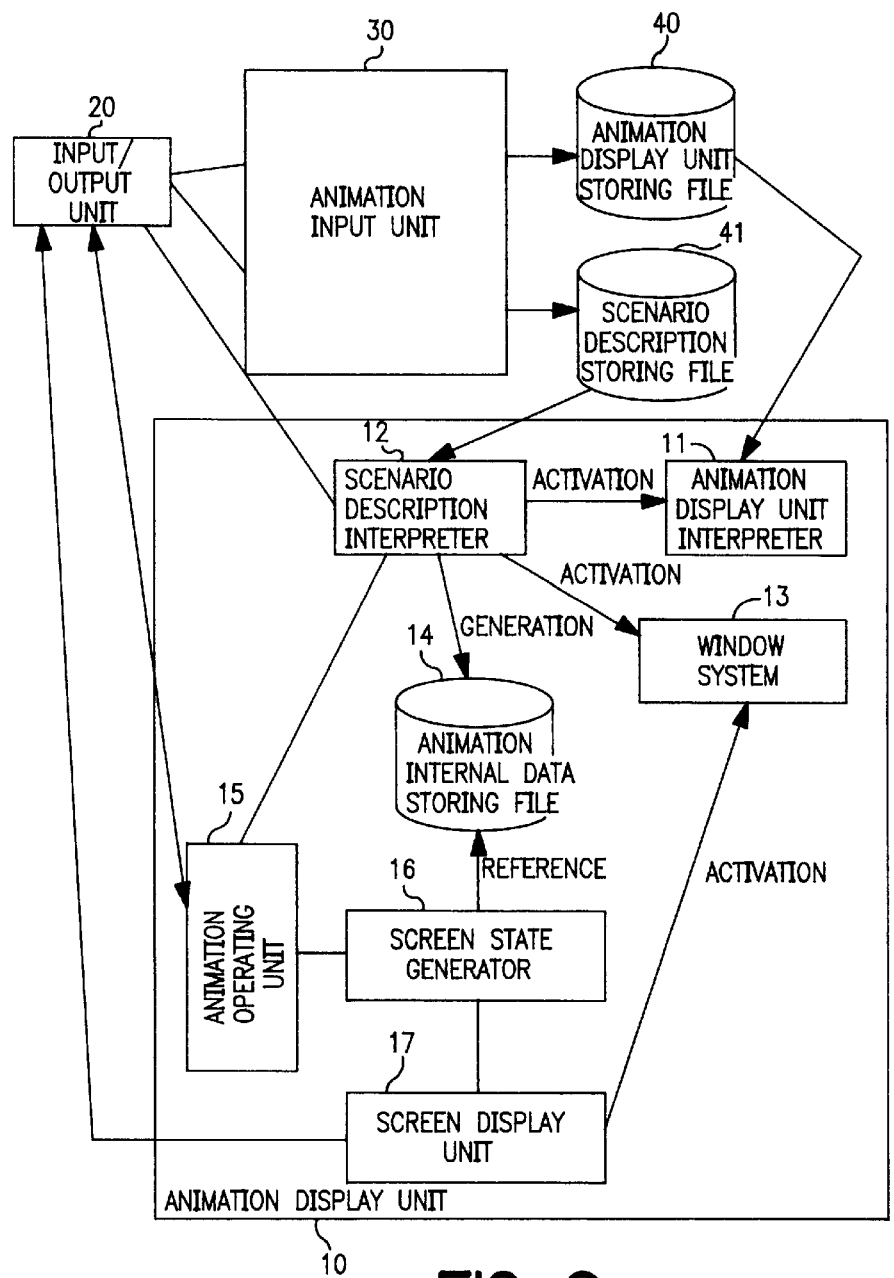
FIG. 2 shows the total configuration of an embodiment of the present invention.

FIG. 2 shows an embodiment of the animation display unit for realizing the present invention. In FIG. 2, 10 is an animation display unit for realizing the present invention; 20 is an input/output unit provided in the animation display unit 10; 30 is an animation display unit input unit for inputting an animation display unit described in association with FIG. 1; 31 is a scenario description input unit for inputting a scenario description described in association with FIG. 1; 40 is an animation display unit storing file for managing an animation display unit inputted by the animation input unit 30; and 41 is a scenario description storing file for managing a scenario description inputted by the animation input unit 30.

First, the animation display unit 10 has the following operation. The animation display unit interpreter 11 interprets an animation display unit stored in the animation display unit storing file 40. A scenario description interpreter 12 interprets a scenario description stored in the scenario description storing file 41 according to the interpretation result of the animation display unit interpreter 11. A window system 13 is, for example, an X window system for opening a window on a display of the input/output unit 20. An animation internal data storing file 14 stores animation internal data generated as an interpretation result of the scenario description interpreter 12. An animation operating unit 15 performs an interfacing operation to the input/output unit 20. A screen state generator 16 generates screen data to be displayed on a display from animation internal data stored in the animation internal data storing file 14. A screen display unit 17 activates the window system 13 to display screen data generated by the screen state generator 16 through a window on a display.

The animation input unit 30 contains an exclusive editor or a general-purpose editor as described later, and a user inputs through the input/output unit 20 an animation display unit comprising one or more frames describing a screen display definition, and stores the animation display unit in the animation display unit storing file 40.

Figure 4A:
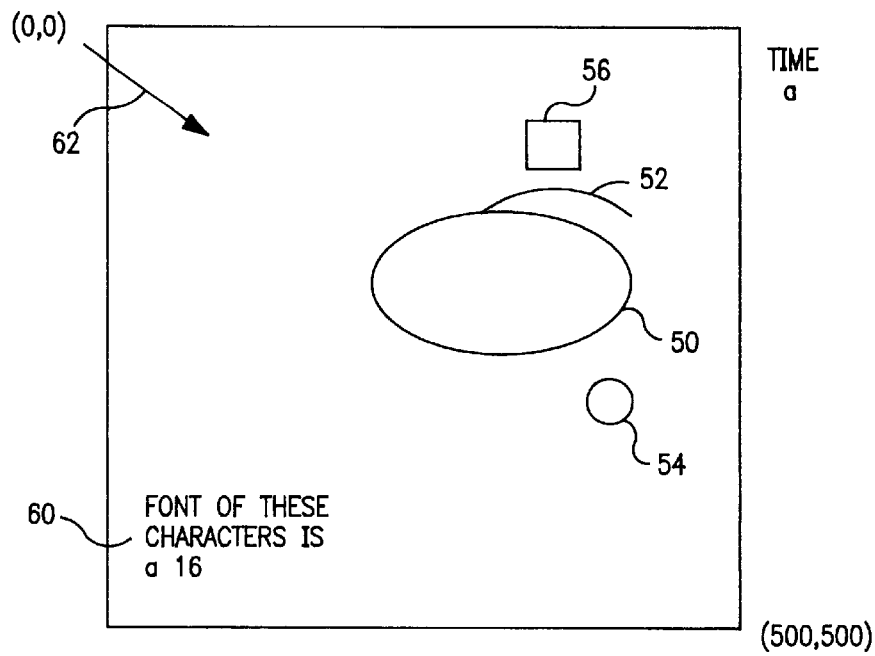
FIGS. 4a and 4b are views for explaining the description format of the animation display unit.
Figure 4B:
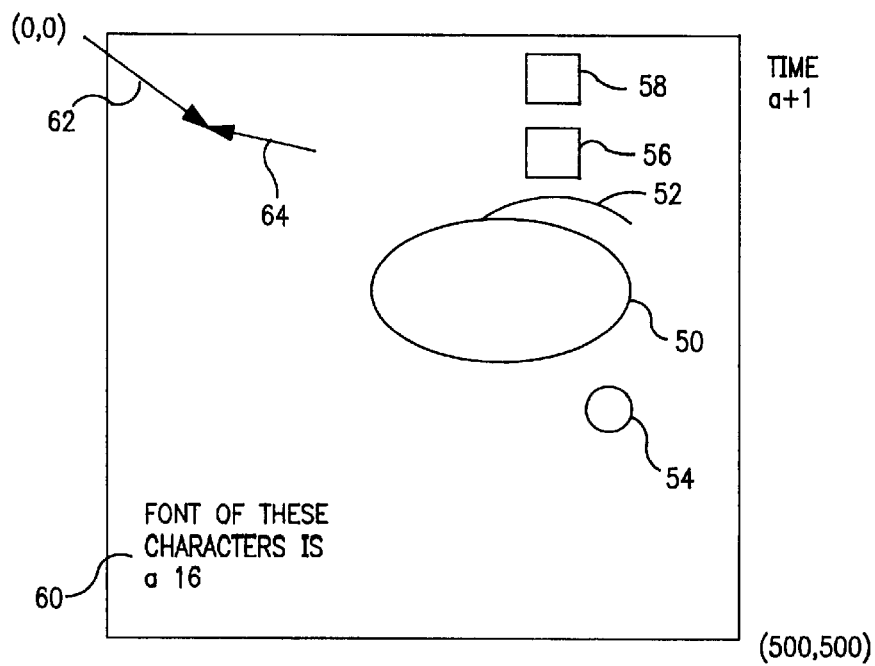

FIG. 3 shows an embodiment of an animation display unit stored in the animation display unit storing file 40. The embodiment describes the screen display state shown in FIG. 4.

A frame forming an animation display unit is a data set describing each screen display definition for each display unit time specified. It describes the kind of figures shown on a display and specific information about the figures together with a graphic identifier (ID).

First, the leading frame describing the screen display state at a particular time describes seven (7) figures. That is, a symbol "arc" added to the graphic IDs "arc 0 (reference numeral 50)" and "arc 1 (reference numeral 52)" means a figure of an "arc." A symbol "circle" added to the graphic ID "cir1 (reference numeral 54)" means a figure of a "circle." A symbol "box" added to the graphic IDs "box1 (reference numeral 58)" and "box1$_{13}$orig (reference numeral 56)" means a rectangular figure. However, they are duplicated. A symbol "string" added to the graphic ID "s3 (reference numeral 60)" means a figure of a "character string". A symbol "arrow" added to the graphic ID "a1 (reference numeral 62)" means a figure of an "arrow." Following a symbol indicating each graphic type, characteristic information indicating the position and size of each figure appears. For example, a numeric character string "400 300 20" preceded by a symbol "cir1" means that the center coordinates of the circle are "400, 300" and its radius is "20". Then, the next frame indicates in the above described representation the screen display state at the next time point (a+1). To reduce the problem of inputting an animation display unit by a user, a screen display definition relating to a predefined figure is established such that it can be reused by referring to a graphic ID.

Then, as described later, a user inputs to the animation input unit 30 through the input/output unit 20 a scenario description indicating the sequence-in-time-series of animation display units displayed through a plurality of windows opened on a display and a scenario description indicating the synchronization among animation display units displayed through these windows. These scenario descriptions are stored in the scenario description storing file 41.

Figure 5A:
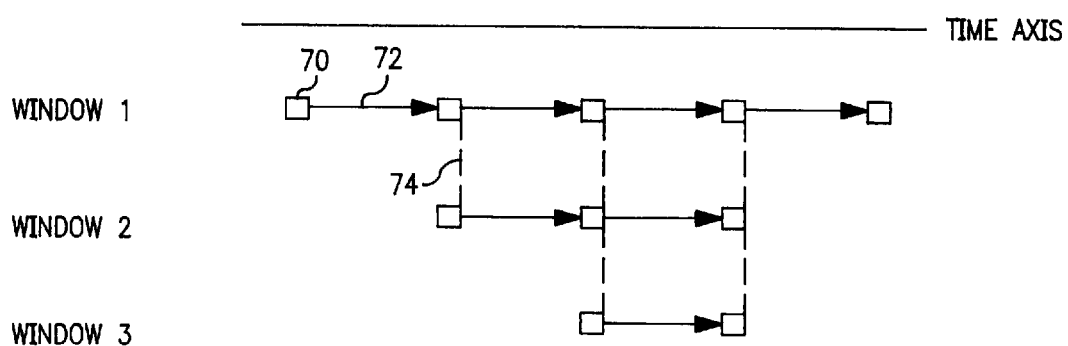
FIGS. 5A and 5B are views for explaining a model of a scenario description.

There are two models of scenario descriptions: a film type model and a network type model. In the embodiment shown in FIG. 2, the unit processes a film type scenario description. The film type scenario description is a model in which, as shown in FIG. 5A, animation display units displayed through the same window are arranged in a time series. As shown by the broken line 74 in FIG. 5A, the synchronization among windows can be established without disturbing the time order. A small square 70 shown in FIG. 5A indicates an animation display unit, and an arrow "72" indicates a sequence in a time series.

Figure 5B:
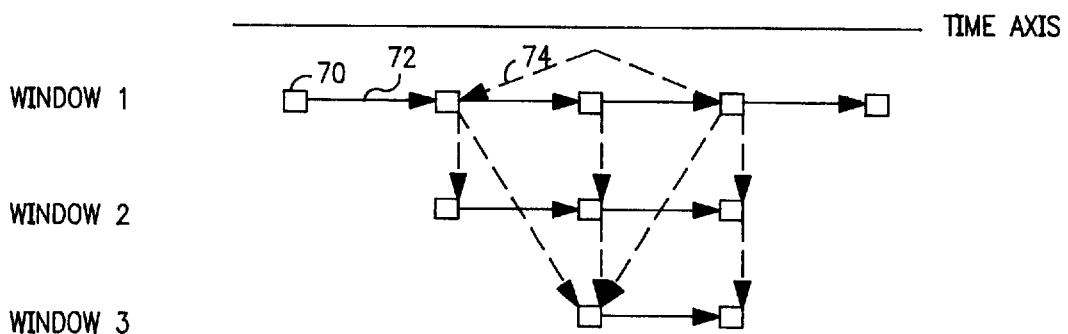

By contrast, a network type scenario description is a model in which the relation among animation display units can be extended freely, permitting a backward process in a time series as shown by the broken line 74 in FIG. 5B and a switch to other animation display units through interaction with a user.

Next, a basic format of a scenario description stored in the scenario description storing file 41 is described.

(1) The following description specifies generating a window:

glueOpen <window name> <width> <height> <x> <y>

The above description indicates that a window having <width> and <height> is opened at the coordinates <x><y> and assigned an ID <window name>. The <window name> is used to refer to the window in other scenario descriptions.

(2) The following description specifies displaying an animation display unit:

glue <glue name> <window name> <file name of an animation display unit>

The description indicates that animation display units stored in <file name of animation display units> are displayed through a window assigned the ID <window name>, and the animation display units are assigned the ID <glue 01, glue 02 . . . >. When descriptions having the same <window name> appear in series in this description format, the animation display units specified by the windows having the ID <window name> are displayed in the order the descriptions appear. A <glue name> must be unique.

(3) The following scenario description specifies clearing a window:

glueclose <window name>

The description indicates that the opened window having the ID <window name> is cleared.

(4) The following scenario description specifies simultaneously displaying animation display units among different windows:

gluesync <glue name 1> <glue name 2>

The description indicates that an animation display unit having an ID <glue name 1> and an animation display unit having an ID <glue name 2> are simultaneously displayed through each window. The <glue name 1> and <glue name 2> must be defined previously.

Figure 6:
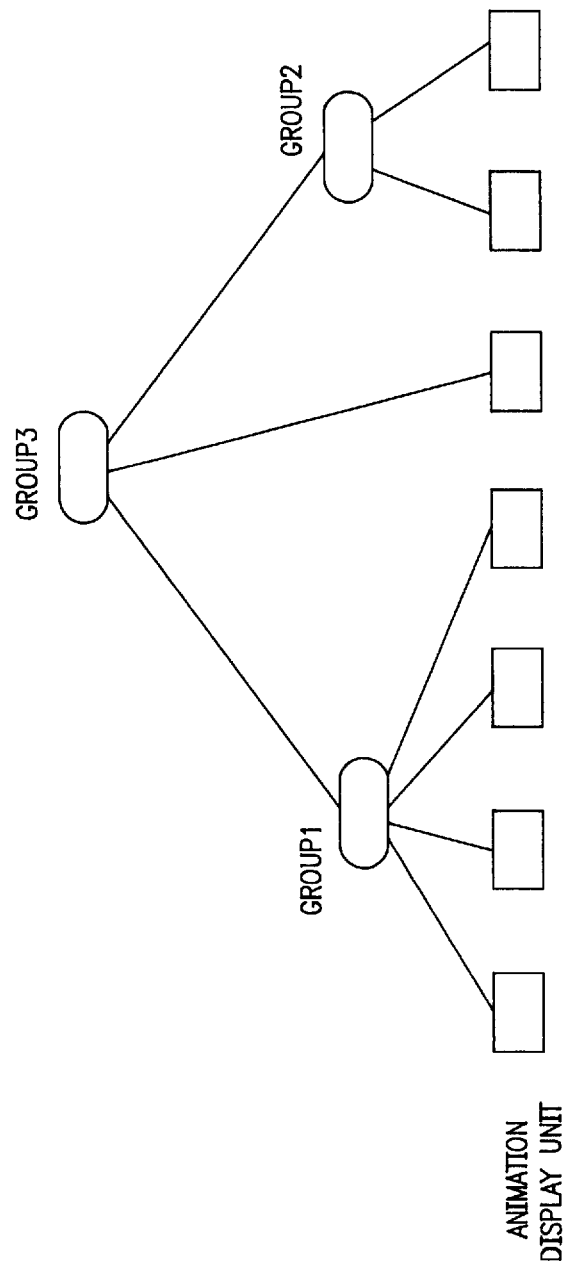
FIG. 6 is a view for explaining the structured animation display unit.

(5) The following scenario description specifies grouping a plurality of animation display units as illustrated in FIG. 6:

group <group name> with (glue name/group name)

The description indicates that a glue or a group having the ID (glue name/group name) (either a glue name or a group name) is defined as one group and is assigned the ID <group name>. The defined group name can be used in the above described gluesync. In this case, the animation display unit having the leading glue name in the group is used.

(6) A network type scenario description permits the time transit to other animation display units as described above. The corresponding description can be represented as follows:

gluebranch from <group name 1> to <glue name 2>, or
gluebranch from <graphic name> in <glue name 1> to <glue name 2>

The former specifies the transit from an animation display unit having the ID <glue name 1> to an animation display unit having the ID <glue name 2>. The latter specifies the transit to an animation display unit having the ID <glue name 2> when a user specifies a figure having the graphic ID <graphic name> in animation display units having the ID <glue name 1> (in a mouse clicking operation).

(7) When a scenario description is provided with a comment, a character "#" is inserted at the head of the line.

With a comment, the scenario description becomes much more readable.

The scenario description stored in the scenario description storing file 41 in the embodiment shown in FIG. 2 can be represented in the above described basic format.

FIGS. 7 and 8 shows an embodiment of the scenario description stored in the scenario description storing file 41 when a manual of a data processor is realized on a display using the animation display processor shown in FIG. 2. The scenario description shown in FIG. 7 is followed by the scenario description shown in FIG. 8.

In FIGS. 7 and 8, after an instruction is issued to open a window having the ID "stage1" and the coordinates "100, 100", the width "640", and the height "600" to display the "explanation of the general description," it is instructed that the four (4) animation display units "directory1/explanation1", "directory1/explanation2", "directory1/explanation3", and "directory1/explanation4," are sequentially displayed through the specified window.

Next, it is instructed that the display of the above described "explanation of the general description" be sequentially followed by the display of the four (4) animation display units "directory1/structure0", "directory3/structure1", "directory3/structure2", and "directory1/structure4" through the same window having the ID "stage1" to realize the "drawing for realization". Then, it is instructed that the window be cleared.

Furthermore, it is instructed that an animation display unit be displayed through the above specified window after a window having the ID "stage 3" is specified to be opened to display the "source file" in association with a part of the above described "explanation for realization". Then, it is instructed that the window be cleared.

Figure 9:
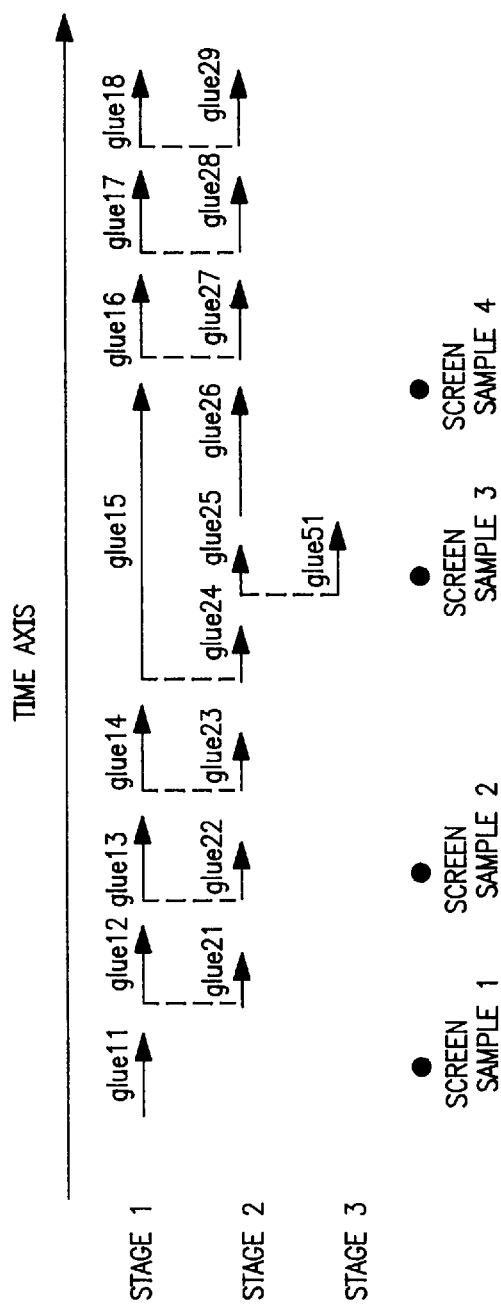
FIG. 9 is a view for explaining the synchronization of the animation display units in an embodiment (shown in FIGS. 7 and 8) of a scenario description)

Following the comment "synchronization", the synchronization among the animation display units displayed through each of the above described windows is described. For example, it is instructed that an animation display unit "directory1/explanation2" having the glue name "glue12" and an animation display unit "directory1/example1" having the glue name "glue51" be simultaneously shown on a display. FIG. 9 shows the synchronous relation between animation display units described by the synchronous relations preceded by the comment "synchronization". In FIG. 9, the actual time length of animation display units is properly adjusted for readability.

The animation display unit 10 shown in FIG. 2 interprets the scenario description stored in the scenario description storing file 41 and the animation display units stored in the animation display unit storing file 40, and then effectively displays the resultant animation (a manual for a data processor in the above described example) on a multiple window screen.

Figure 10:
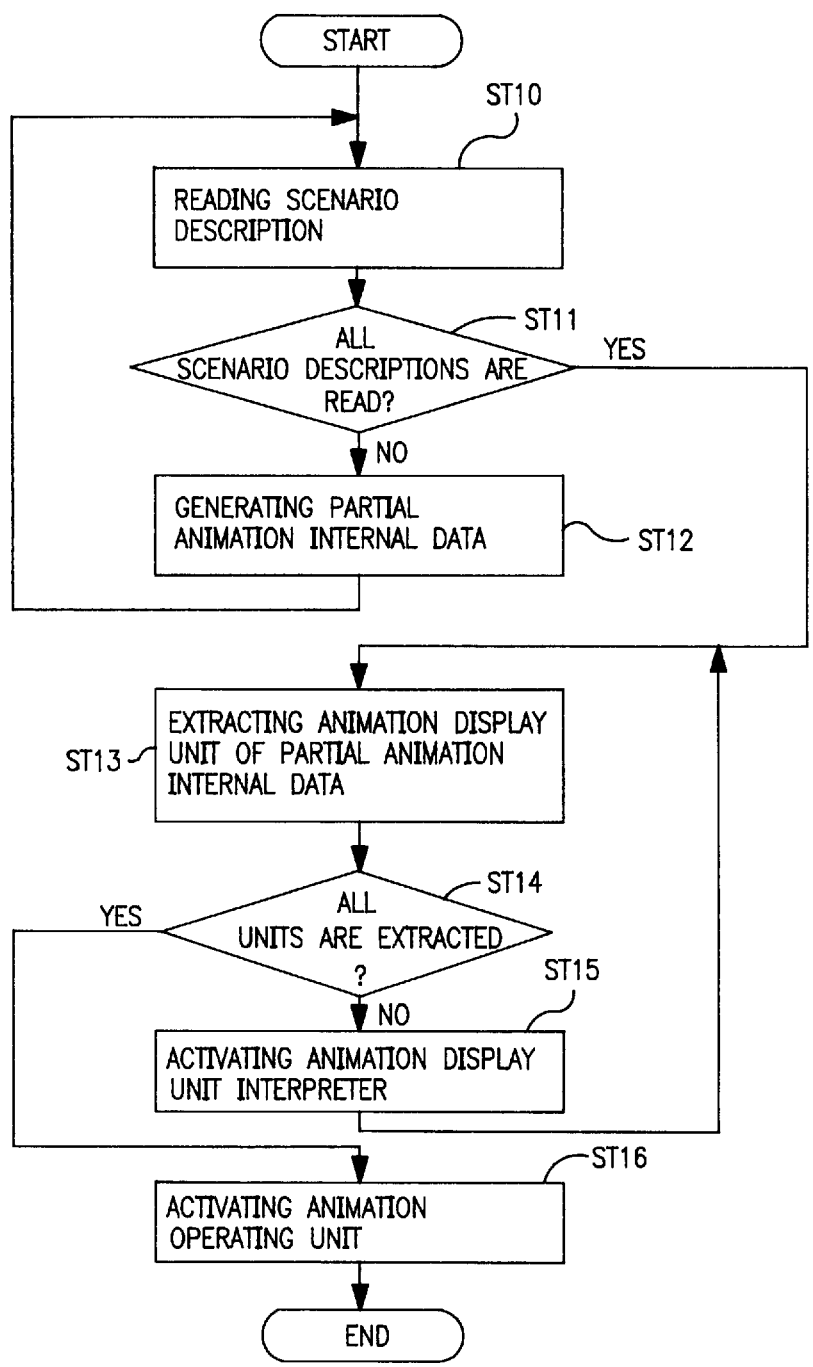
FIG. 10 is a process flowchart for explaining the operation of the scenario description interpreter.

FIG. 10 illustrates an embodiment of the process flow of the scenario description interpreter 12 for interpreting a scenario description.

First, in step (ST) 10, a scenario description is read from the scenario description storing file 41.

Then, in step 11, determination is made as to whether or not scenario descriptions exist in the scenario description storing file 41.

If a scenario description still exists in the scenario description storing file 41, and the determination in step 11 indicates "NO", the format of the read scenario is identified in step 12, and animation internal data are generated as a result of the interpretation of the scenario descriptions by generating each piece of window data, animation display unit, link relation between them, global variable (described later), etc. As for an animation display unit, since actual screen data are linked by activating the animation display unit interpreter 11 in step 14, described later, a part of the animation internal data (hereinafter referred to as partial animation internal data) are generated immediately after step 12.

FIG. 12 shows an embodiment of partial animation internal data generated according to the action of the above described scenario description interpreter 12

For example, when the scenario description read from the scenario description storing file 41, shown in FIG. 2, is a scenario description "glueopen" previously described in (1), a "window" structure is generated as shown in FIG. 12, and the window system 13 shown in FIG. 2 is activated with the window width, height, and x and y coordinates inputted as parameters. When the scenario description read from the scenario description storing file 41 is control data for establishing a window, for example, X Window system, control data called "Widget" are generated. Then, the pointer to the control data is set as the data of the above described "window" structure, and other data in the structure are set accordingly.

When the scenario description read from the scenario description storing file 41 is the scenario description "glue" previously described in (2), the "animation display unit" structure shown in FIG. 12 is generated, and its file name and glue name are set as data. A pointer to this structure is set as the last data for the animation display unit list of the "window" structure associated with the window specified with the window name.

When the scenario description read from the scenario description storing file 41 is the scenario description "glueSync" previously described in (4), a new element is added as data for the synchronization list of the "animation display unit" structure shown in FIG. 12. Simultaneously, a pointer to the "animation display unit" structure which is synchronous with the element is set. In the synchronous "animation display unit" structure, similar settings are made.

When the scenario description read from the scenario description storing file 41 is the scenario description "gluebranch from <glue name 1> to <glue name 2> " previously described in (6), a new element is added as the data for the triggered-to position list of the "animation display unit" structure having the glue name 1, and a pointer to the "animation display unit" structure having the glue name 2 is stored as its element.

When the scenario description read from the scenario description storing file 41 is the scenario description "gluebranch from <graphic name> in <glue name 1> to <glue name 2>" previously described in (4), a new element is added as the data for the triggered-to position list of the "animation display unit" structure having the glue name 1, and a graphic name of the specified text format and a pointer to the "animation display unit" structure having the glue name 2 are stored as its element.

As described in the above example, when partial animation internal data are generated according to the read scenario descriptions, control is returned to the process in step 10 shown in FIG. 10, the next scenario description is read from the scenario description storing file 41, and the partial animation internal data corresponding to the scenario description are generated in step 12.

When no scenario descriptions exist in the scenario description storing file 41 after repeating the above described processes and the determination in step 11 indicates YES, the process restarts at step 13.

In step 13, a file name of each animation display unit is extracted by searching each of the animation display units of the generated partial animation internal data.

If a file name is extracted, the determination in step 14 indicates "NO", and the animation display unit interpreter 11 is activated according to the extracted file name of each animation display unit in step 15.

Figure 11:
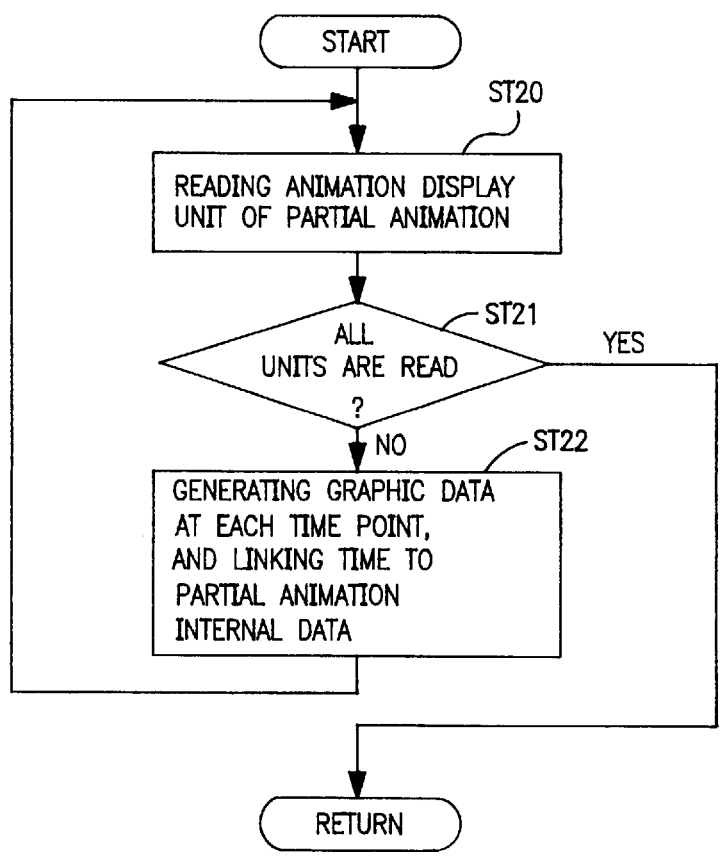
FIG. 11 is a process flowchart for explaining the operation of the animation display unit interpreter.

FIG. 11 shows an embodiment of the process flow of the animation display unit interpreter 11 for interpreting animation display units.

First, in step 20, data of an animation display unit corresponding to a file name are read from the animation display unit storing file 40 by referring to the file name of the above described animation display unit.

Next, in step 21, determination is made as to whether or not all data are read for the animation display unit which is referred to.

If the determination in step 21 indicates "NO" and data still exist in the animation display unit, screen data are generated and the generated screen data are linked to the partial animation internal data (corresponding to the above described file name) generated by the scenario description interpreter 12. That is, the screen data are generated such that the shape, size, position, etc. of each figure are included as one structure in the partial animation internal data in the list format. A pointer to the list is set as the screen data of the "animation display unit" structure shown in FIG. 12.

As a result, complete animation internal data are generated and stored in the animation internal data storing file 14.

Afterwards, control is returned to the scenario description interpreter 12, shown in FIG. 2, and it returns control to the process in step 13 shown in FIG. 10. By searching each of the animation display units of the generated partial animation internal data, the file name of the next animation display unit is extracted, according to which the animation display unit interpreter 11 is activated, thus generating the screen data and animation internal data.

If no more file names of animation display units to be searched exist and the determination in step 14 indicates "YES" after repeating the above described process, the animation operating unit 15 shown in FIG. 2 is activated in step 16 and the animation (in the preceding example, a manual of a data processor) is displayed to the input/output unit 20 according to the animation internal data generated as described above. That is, the animation operating unit 15 first displays a window of a control panel described later in a display of the input/output unit 20. When a user executes an instruction to display the animation according to the control panel, the screen state generator 16 generates screen data by searching the animation internal data stored in the animation internal data storing file 14. Then, the screen display unit 17 displays the screen data on the display using the window system 13. Thus, the animation can be displayed in the multiple window format. The operation of the screen state generator 16 is explained later in detail in association with FIG. 27.

FIGS. 13–22 show a part of the manual of a data processor as an example of animation shown on a display and based on the above described animation display process according to the scenario description shown in FIGS. 7 and 8.

Figure 13:
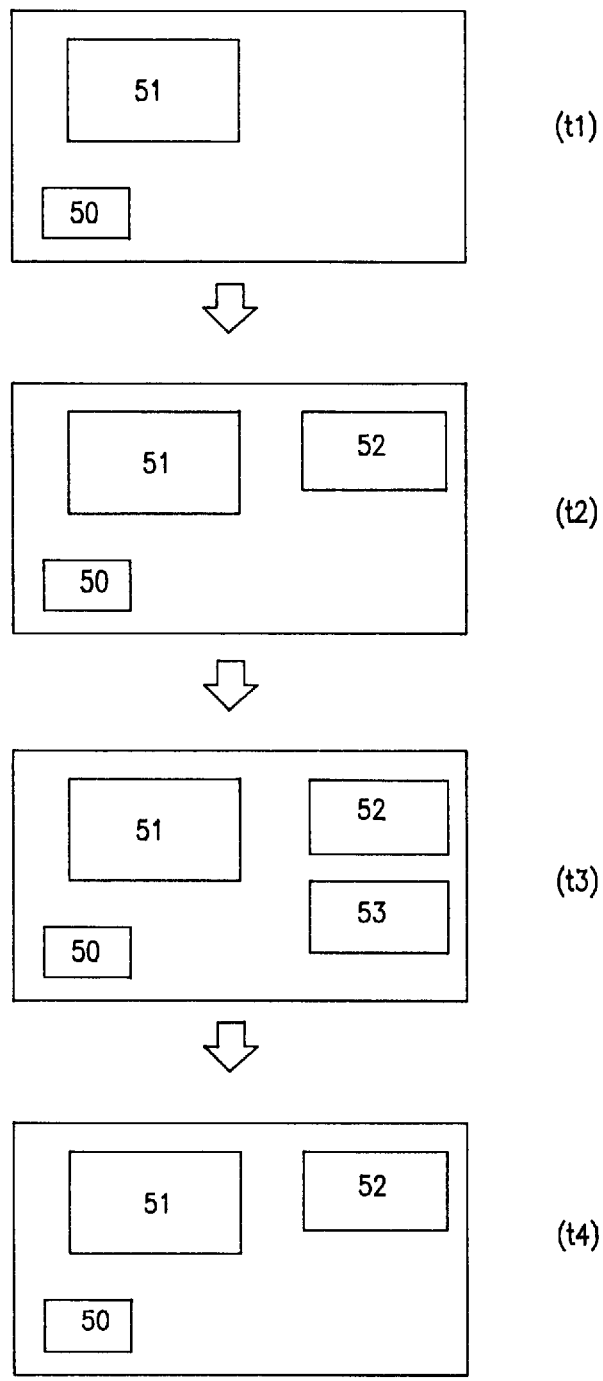
FIG. 13 is a view for explaining the process of displaying explanatory animation for a manual.

First, FIG. 13 shows the arrangement of windows on a display. In FIG. 13, 50 is a control panel; 51 is a window having an ID "stage1"; 52 is a window having an ID "stage2"; and 53 is a window having an ID "stage3".

Figure 14:
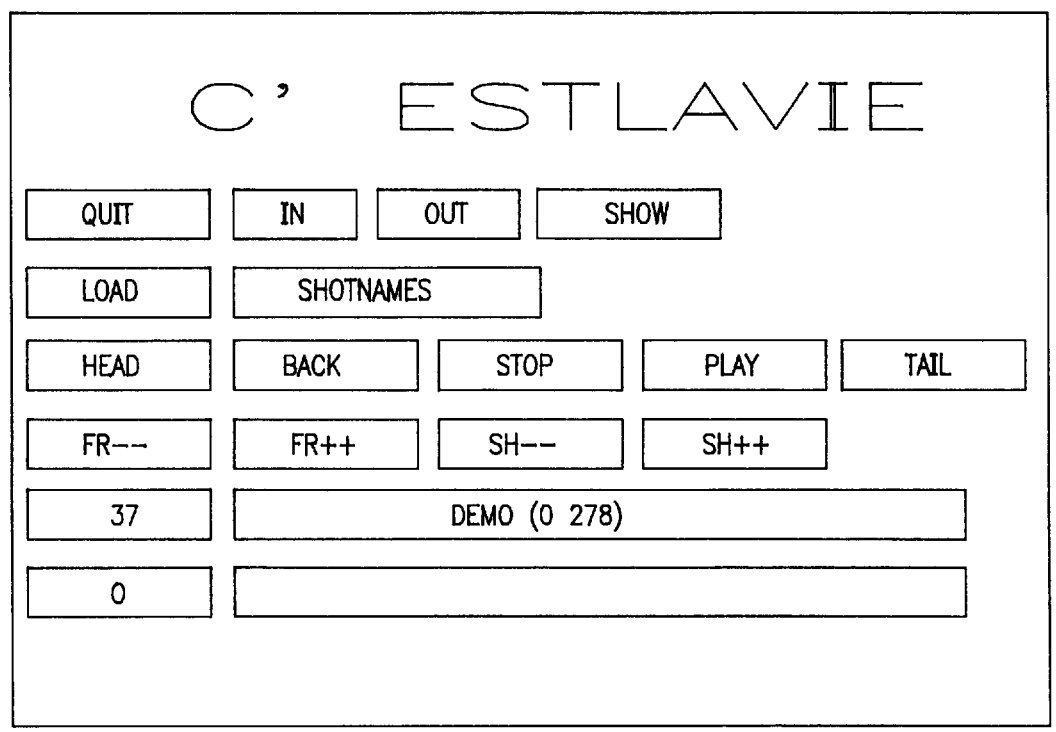
FIG. 14 is a view for explaining an embodiment of the control panel display.
Figure 18:
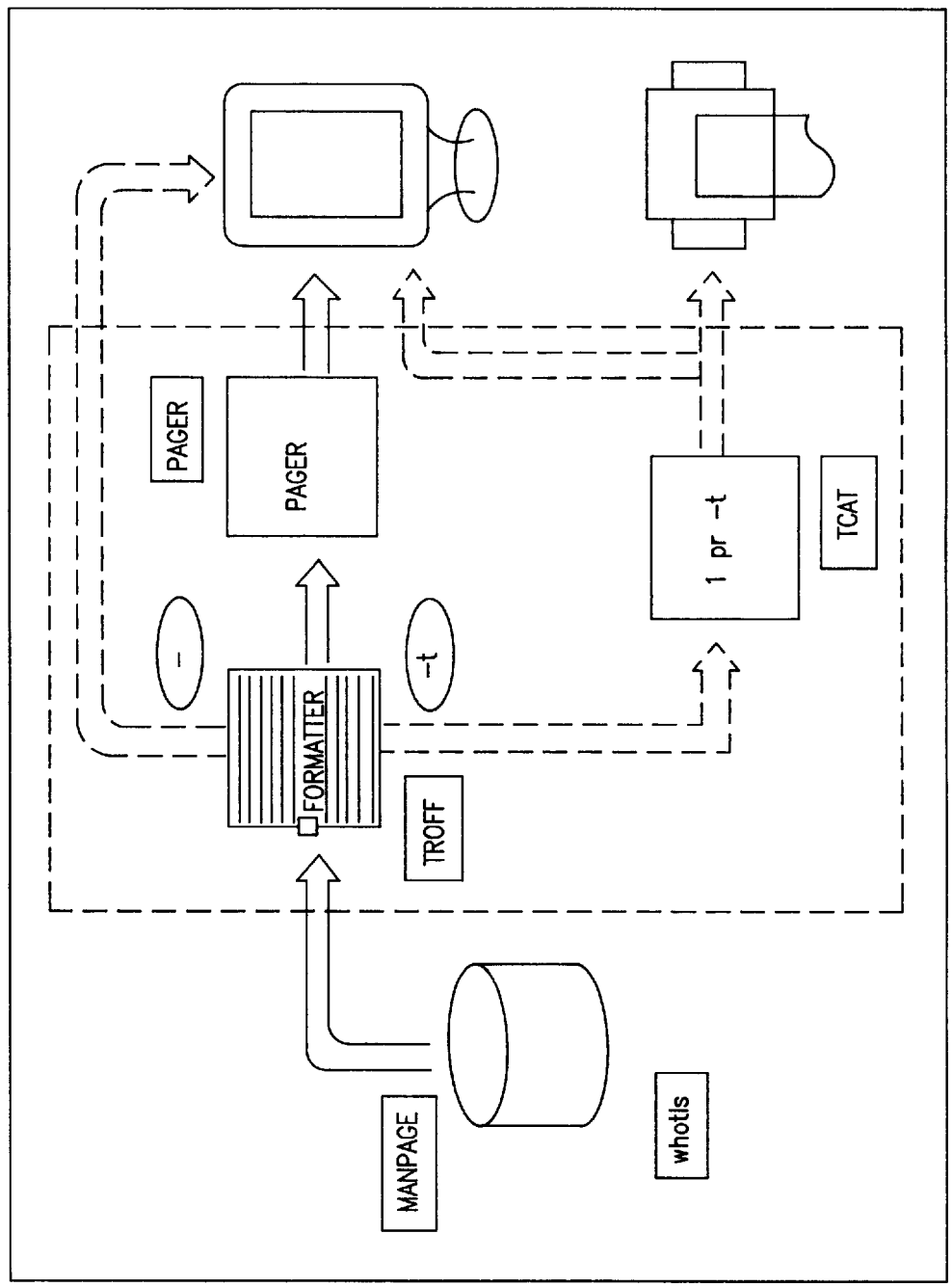
Figure 21:
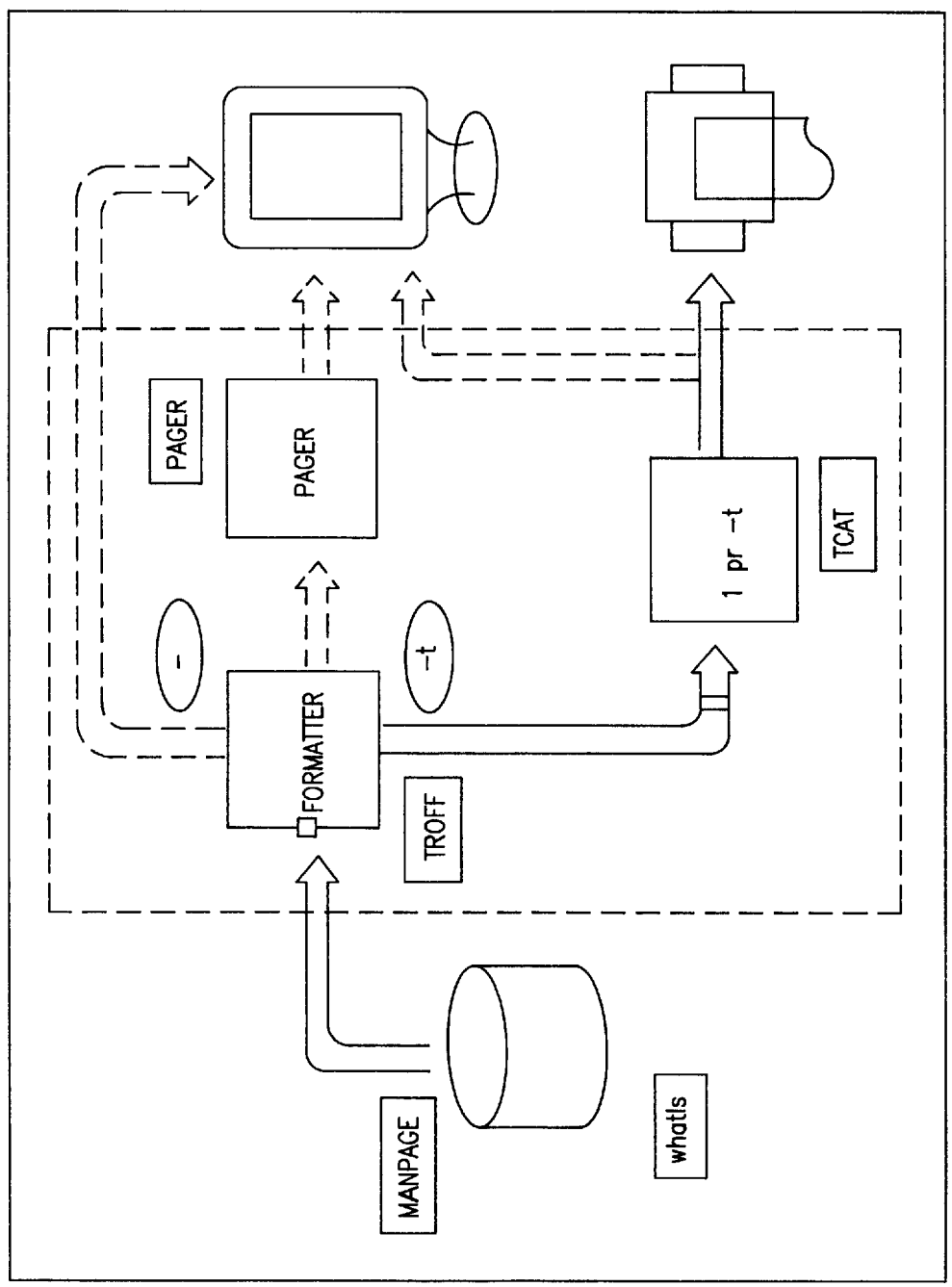

FIG. 14 shows the screen configuration of the control panel 50. The control panel 50 is provided with a "play" key for specifying playing back animation, a "back" key for specifying rewinding, a "stop" key for specifying stopping, a "head" key for specifying returning to the head, a "trail" key for specifying moving to the end, an "fr++" key for specifying transmitting a frame, an "fr--" key for specifying sending back a frame, an "sh++" key for specifying forward movement between animation display units, an "sh--" key for specifying backward movement between animation display units, etc.

In FIG. 13, the representation of the window at time t1 corresponds to the sample screen 1 shown in FIG. 9. On the screen, a window having an ID "stage1" is opened through which the "explanation of general description" shown in FIG. 15 corresponding to the animation display unit having an ID "directory1/explanation1" is displayed.

The window representation at time t2 shown in FIG. 13 corresponds to the sample screen 2 shown in FIG. 9. In the screen, the "explanation of the general description" shown in FIG. 16 corresponding to the animation display unit "directory1/explanation3" is displayed through window 51 having an ID "stage1." Simultaneously, a window 52 having an ID "stage2" is opened through which a "sample output" shown in FIG. 17 corresponding to the animation display unit "directory1/example2" is displayed. When window 52 is opened, a bell is rung to attract the user's attention.

Then, the window representation at time t3 shown in FIG. 13 corresponds to the sample screen 3 shown in FIG. 9. The "drawing for realization" shown in FIG. 18 corresponding to the animation display unit "directory2/structure0" is displayed through window 51 having an ID "stage1" on the screen. Simultaneously, the "explanation for realization" shown in FIG. 19 corresponding to the animation display unit "directory3/implementation5" through window 52 having an ID "stage2". At the same time, window 53 having an ID "stage3" is opened through which the "source file" shown in FIG. 20 corresponding to the animation display unit "directory3/examplefile" is displayed.

Furthermore, the window representation at time t4 shown in FIG. 13 corresponds to the sample screen 4 shown in FIG. 9. The "drawing for realization" shown in FIG. 21 corresponding to the animation display unit "directory2/structure0" is displayed through window 51 having an ID "stage1" on the screen. The "explanation for realization" shown in FIG. 22 corresponding to the animation display unit "directory1/implementation6" is displayed through window 52 having an ID "stage2" on the screen. Simultaneously, window 53 having an ID "stage3" is cleared.

As described above, the animation of a manual of a data processor can be effectively displayed on a multiple window screen.

Another Embodiment of the Animation Display Unit 10

Figure 23:
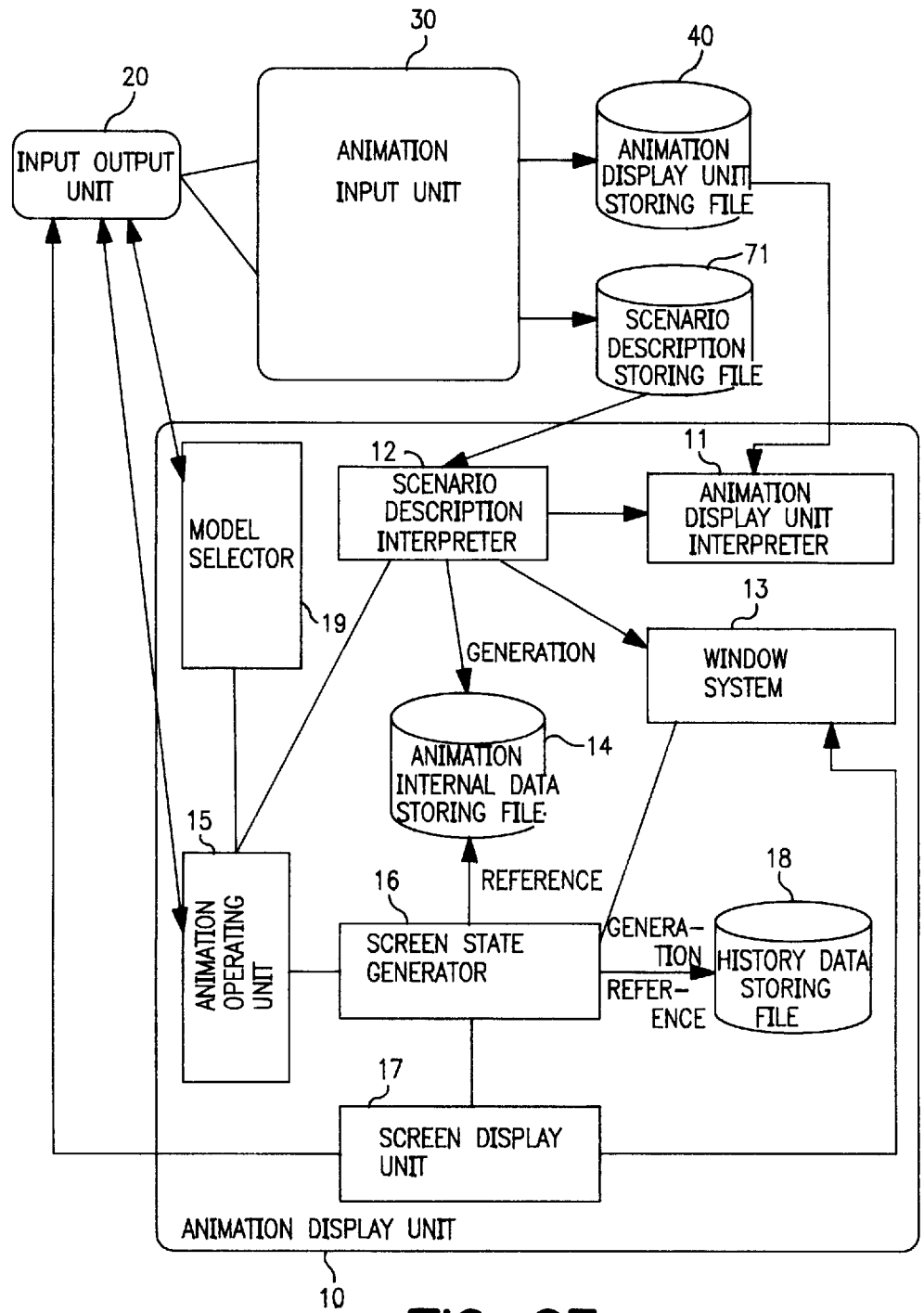
FIG. 23 shows the total configuration of another embodiment of the present invention.

FIG. 23 shows another embodiment of the animation display unit for realizing the present invention. In FIG. 23, the parts assigned the same numbers as those shown in FIG. 2 perform the same functions.

In the embodiment, a device processes a network type scenario description described in association with FIG. 5B, and has a function of dynamically modifying animation data.

With the film-type scenario description indicated in FIG. 5A, the screen state at any time point can be easily regenerated because animation display units are arranged in a time series, thereby enabling backward processing of animation. By contrast, with the network-type scenario description, the configuration of the embodiment shown in FIG. 2 cannot realize the backward processing of animation because the content of a display changes depending on various conditions. Therefore, the embodiment shown in FIG. 23 is provided with a history data storing file 18 for recording the transit of animation display units to the history data storing file 18, thus realizing according to the record the backward processing of animation with a network-type scenario description If the transit of animation display units is recorded to the history data storing file 18 without limit, a large part of a memory is occupied by the record. Therefore, the embodiment shown in FIG. 23 is provided with a model selector 19 for selecting through an interaction with a user whether or not he (or she) requests the backward process. When the model selector 19 does not select the backward process, the waste of a memory is reduced by preventing the history data storing file 18 from saving data.

FIGS. 24 and 25 show an embodiment of the scenario description stored in the scenario description storing file 41 in the embodiment shown in FIG. 23. FIG. 26 shows an embodiment of the animation internal data stored in the animation internal data storing file 14 in the embodiment shown in FIG. 23. The scenario description shown in FIG. 24 is followed by the scenario description shown in FIG. 25.

The descriptions (i) to (iv) shown in FIGS. 24 and 25 include a scenario description "gluebranch from" described above in (6), which is unique to a network-type description.

The descriptions in (a) to (c) in FIGS. 24 and 25 include a scenario description "group" described above in (5) for specifying grouping animation display units. When animation display units are grouped, they can display the animation for indicating a document having chapters and clauses wherein a user can display desired animation at his (or her) request by optionally moving the chapters and clauses.

Detailed Operation of the Screen State Generator 16

Figure 27:
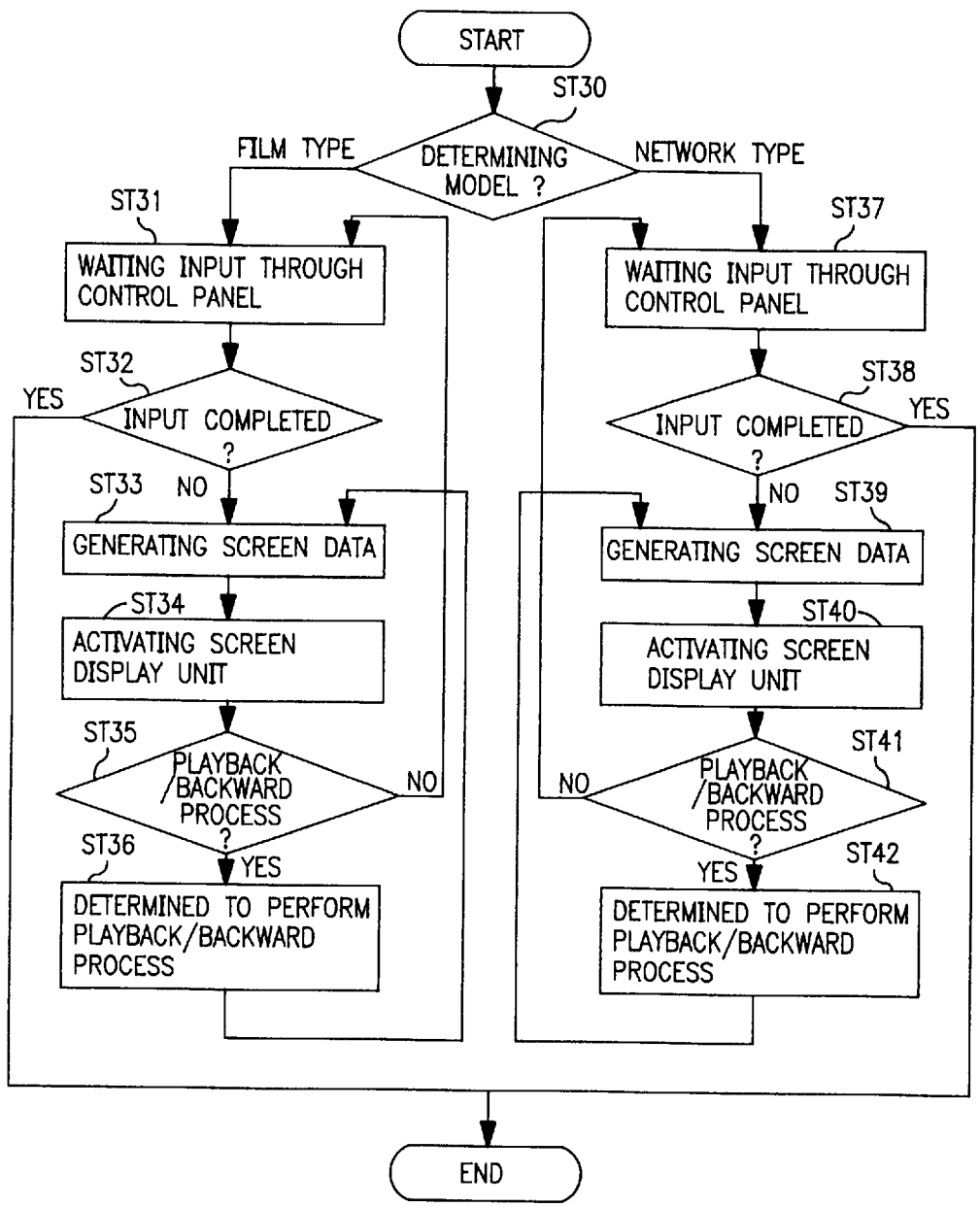
FIG. 27 is a process flowchart for explaining the operation of the screen state generator.

Next, a process flow executed by the screen state generator 16 shown in FIG. 2, is explained in detail in FIG. 27. When the screen state generator 16 is realized in the embodiment shown in FIG. 2, only the film-type scenario description is processed, and the processes in steps 31–36 are thereby performed unconditionally. When the screen state generator 16 is realized in the embodiment shown in FIG. 23, both the film-type and the network-type scenario descriptions are processed, and the processes in steps 30–42 are thereby performed. Hereafter, for simplification, the screen state generator 16 is assumed to be realized in the embodiment shown in FIG. 2.

In step 30, determination is made as to whether the scenario description is film-type or network type after the above described global variables are read from the animation internal data storing file 14 and the settings are checked.

When the scenario description is determined to be film type, the user is prompted at the control panel in step 31.

In response to the input, determination is made as to whether or not it indicates the end of input.

If the input is determined as indicating an item other than an end of input, screen data are generated in step 33. That is, when the input specifies "playback/backward process (note: "play/back"), time records are updated and the screen data of the animation display units at the following/previous time are generated. If the time is beyond the starting/ending time, an appropriate animation display unit is retrieved in the previous or following animation display units, and the identical processes are performed on them. If the input specifies the "movement to the head/end of the animation", the time is assumed to be the time to start/end the scenario, and the screen data of the animation display units at that time for the window opened at that time are thus generated.

Next, in step 34, the screen display unit 17 is activated. Thus, the screen display unit 17 displays through the corresponding window each figure shown by the screen data using drawing functions of the window system 13.

In step 35, determination is made as to whether or not the input from the control panel indicates "playback/backward process" or another.

When the input indicates "playback/backward process", the input "playback/backward process" is automatically generated in step 36, and control is returned to step 33. Therefore, the playing back and backward processes can be continuously performed by inputting "playback/backward process".

If the input indicates an item other than "playback/backward process", control is returned from step 35 to step 31, and the process thus enters the state of waiting for input from the control panel.

If the determination indicates a network-type scenario description in step 30, a user input is requested at the control panel.

When input is received in step 38, determination is made as to whether or not it indicates the end of input.

If the determination indicates an item other than the end of input, screen data are generated in step 39. That is, when the input indicates "playing back/backward process", the currently displayed animation display unit list in the animation internal data storing file 14 is searched, and the screen data following/preceding the currently displayed screen data are thus generated. If no screen data to be displayed exist, the head of the screen data following/preceding the currently displayed animation display unit is generated. If the input indicates "clicking the screen", a moving list (shown in FIG. 26) is retrieved according to the information about a graphic ID and the animation display unit at which a click is made, thus displaying the data through a window.

Then, in step 40, the screen display unit 17 is activated. The screen display unit 17 displays through the corresponding window each of the figures according to screen data and the drawing functions of the window system 13.

In step 41, determination is made as to whether or not the input from the control panel indicates "playback/backward process.

If yes, the input of "playing back/backward process" is automatically generated in step 42, and control is returned to step 39. The playing back process and backward process of animation display units are thereby serially performed by inputting "playback/backward process".

Thus, the screen state generator 16 generates screen data depending on the type of scenario description.

If the input indicates "playing back/backward process", control is returned from step 41 to step 37, and the process enters the state of waiting for input from the control panel.

Embodiment of the Animation Input Unit 30

Figure 28:
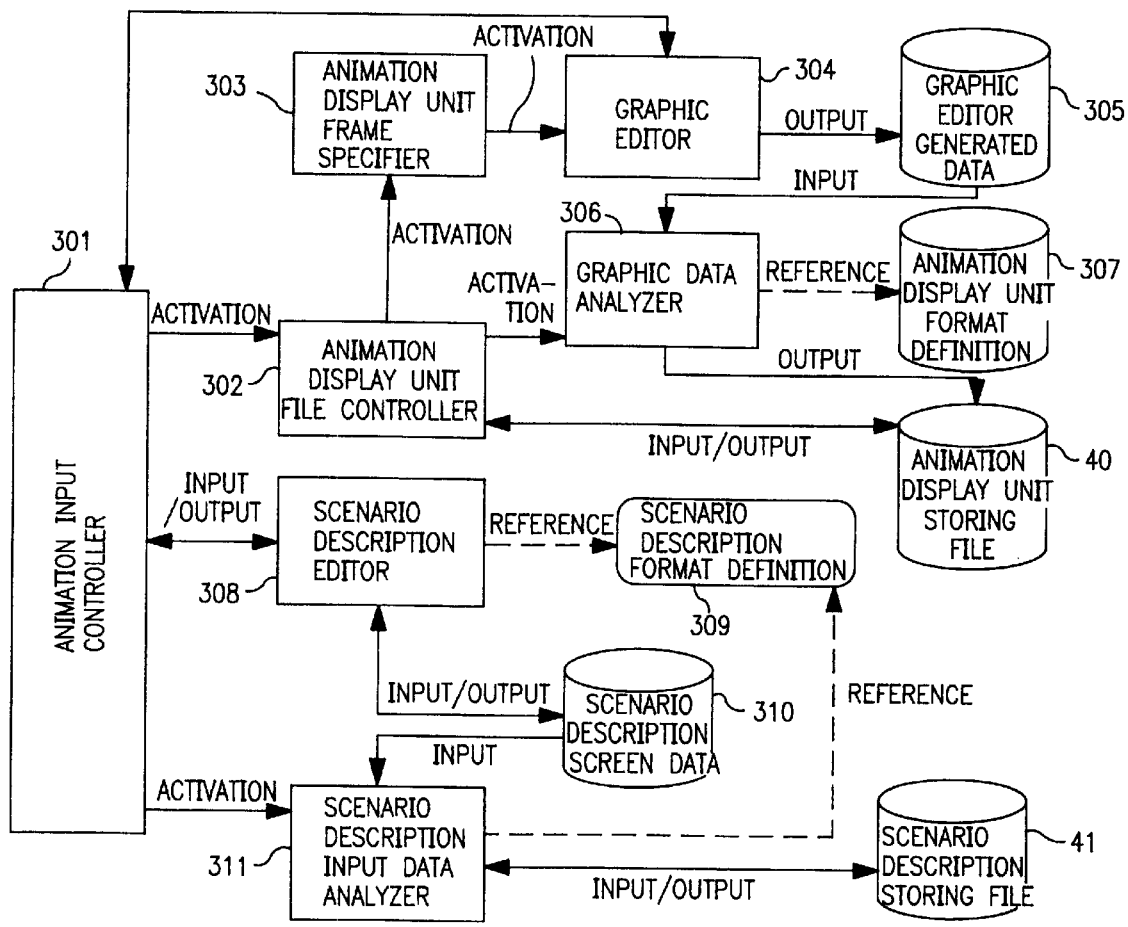
FIG. 28 shows an embodiment of the configuration of the animation input unit.
Figure 30:
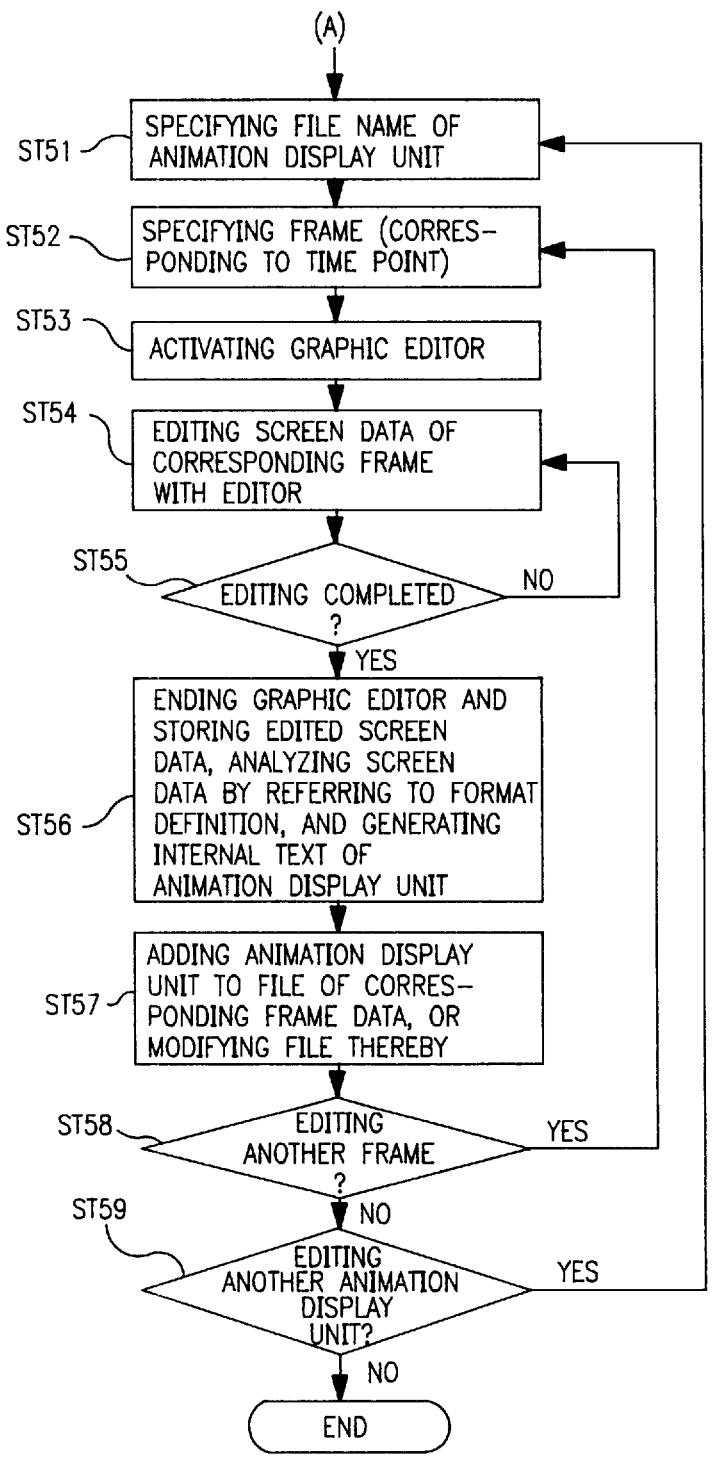
Figure 31:
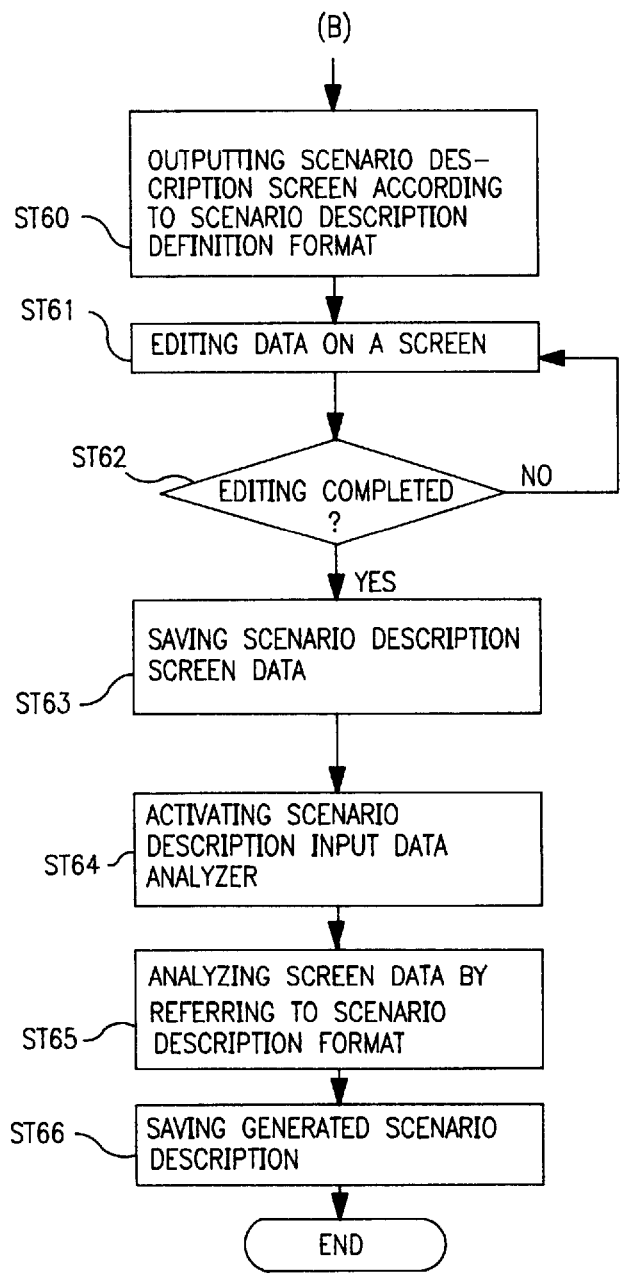

FIG. 28 shows an embodiment of the animation input unit 30 shown in FIG. 2 and 23. The operation of the animation input unit 30 is illustrated in the process flowchart in FIGS. 29–31 and in the explanatory view shown in FIG. 32.

Figure 29:
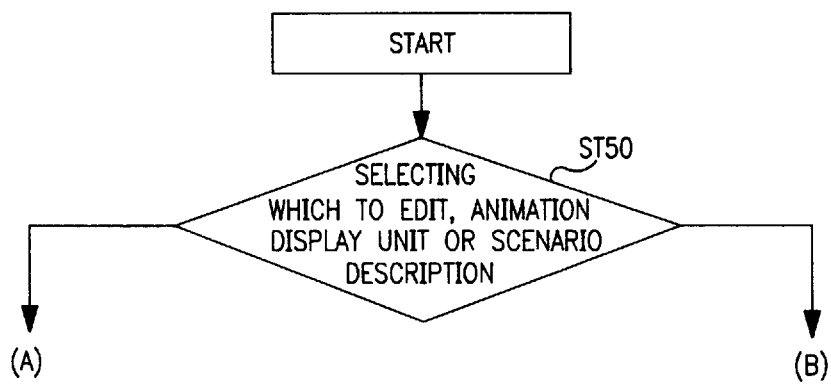
FIGS. 29–31 are process flowcharts for explaining the operation of the animation input unit.

The animation input unit 301 selects an editing target, that is, an animation display unit or a scenario description, according to a user's instruction through the input/output unit 20 in step 50 shown in FIG. 29.

If the user specifies an editing of an animation display unit, an animation input unit 301 activates an animation display unit file controller 302.

Animation display units are managed in a file unit. The animation display unit file controller 302 retrieves the file corresponding to the user-specified file name to see whether or not it exists in the animation display unit storing file 40. If yes, the file is selected as an editing target. If no, a new file is generated as an editing target. Then, the animation display unit file controller 302 activates the animation display unit frame specifier 303.

Animation display units are edited in a frame (time) unit. The animation display unit frame specifier 303 specifies a user-specified frame as an editing target in the file set by the animation display unit file controller 302 in step 52, and then activates a graphic editor 304. If the file exists in the animation display unit storing file 40 and contains the specified frame, the data of the animation display units of the frame are read by the graphic editor 304 and displayed.

A user edits screen data of the frame through the graphic editor 304 by repeating the processes of steps 54 and 55. As the graphic editor 304, an existing general purpose editor or a new exclusive graphic editor developed based on the existing technology can be utilized. The animation input controller 301 controls the transmission of graphic data between the user-operated data input/output unit 20 shown in FIGS. 2 and 23 and the graphic editor 304.

If a user specifies the end of an editing process performed by the graphic editor 304, the determination in step 55 indicates YES, and the editing result is stored as graphic editor generating data 305 in a disc storage device, etc. Then, the animation display unit file controller 302 activates a graphic data analyzer 306.

In step 56 the graphic data analyzer 306 generates frame data of animation display units represented in the internal text format as illustrated in FIG. 3 by referring to a format definition 307 of an animation display unit.

In step 57, the animation display unit file controller 302 adds the generated frame data of animation display units to a specified file, or replaces the frame data in the file with the generated frame data.

If the user specifies an editing of another frame, the animation display unit file controller 302 returns control from step 58 to step 52, thus repeating control processes to edit the new frame.

If the user specifies editing another animation display unit, the animation display unit file controller 302 returns control from step 59 to step 51, repeating control processes to edit the new animation display unit.

If the user specifies an editing of a scenario description, the animation input unit 301 activates a scenario description editor 308.

Figure 32:
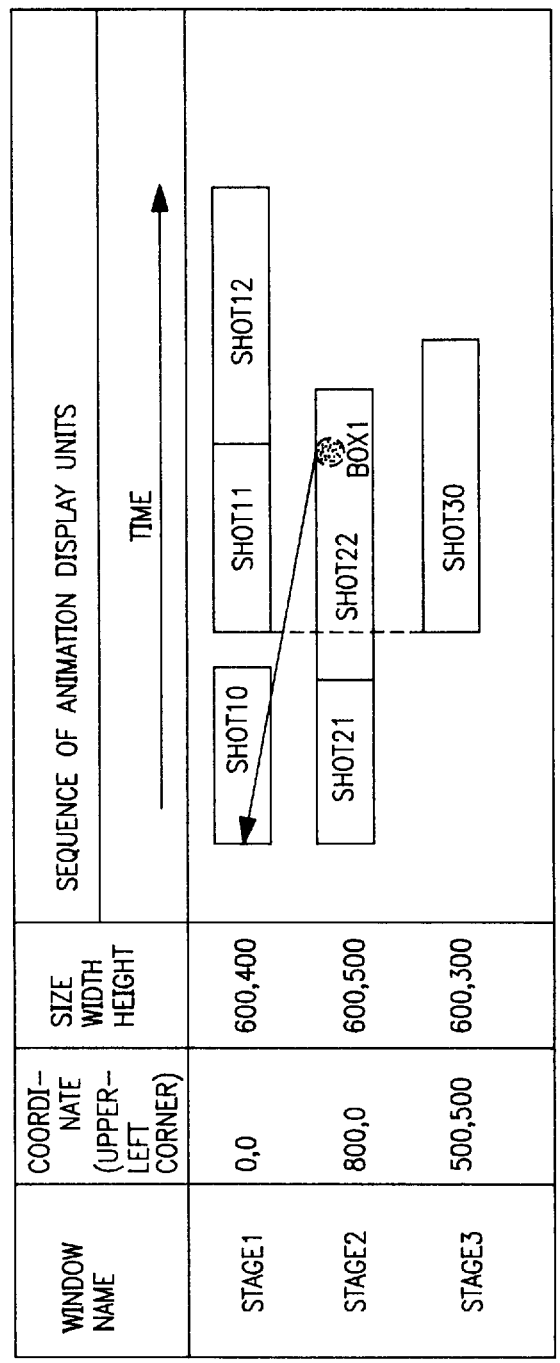
FIG. 32 is a view for explaining an editing screen of the animation display unit in the two-dimensional table representation.

In step 60, the scenario description editor 308 displays a scenario description editing screen in the editing screen format predetermined as a scenario description format definition 309, and then enables a user to edit scenario descriptions on an editing screen shown in FIG. 32 by repeating the processes in steps 61 and 62. The animation input controller 301 controls the transmission of data between the user-operated data input/output unit 20 shown in FIGS. 2 and 23 and the scenario description editor 308.

A user specifies a name, coordinates, size (width and height), etc. of each window by entering corresponding items in the table on the screen. The sequence of animation display units in each window can be edited by operating a mouse to adjust the order of small squares each displayed together with a character string indicating a name as shown in FIG. 32.

When the transit from a predetermined figure in predetermined animation display units is triggered by clicking a mouse while animation is being displayed, as shown in FIG. 32, a desired graphic name (ID) is entered within a square corresponding to the animation display unit for which a trigger is permitted and an arrow is set to point from a rectangle corresponding to a trigger-permitted animation display unit to a square corresponding to a desired animation display unit.

When the user specifies the end of editing scenario descriptions, the determination in step 62 indicates YES, and the editing result is stored as scenario description screen data 310 in a disk storage device, etc. in step 63. Then, in step 64, the scenario description editor 308 activates the scenario description input data analyzer 311.

In step 65, a scenario description input data analyzer 311 generates data of a scenario description represented in the internal text format illustrated in FIGS. 7 and 8 by referring to the scenario description screen data 310, the editing screen format predefined as the scenario description format definition 309, and the scenario description format in the internal text format predetermined as the scenario description format definition 309. As described in association with FIGS. 7 and 8, various information about a window position, a sequence of animation display units with the window, synchronization among animation display units in different windows, a figure indicating the activation of transit to an animation display unit, and an animation display unit as a transit destination are generated and described in the format recognized by the scenario description interpreter 12 shown in FIGS. 2 and 23.

In Step 66, the scenario description input data analyzer 311 stores the above described scenario in the scenario description storing file 41 shown in FIGS. 2 and 23.

The scenario description stored in the scenario description storing file 41 is interpreted by the scenario description interpreter 12. In this case, the process of time of each frame of each animation display unit displayed through each window according to a scenario description can be automatically determined by assigning an appropriate time value to each frame such that the synchronization between animation display units can be retained.

Another Embodiment of the Animation Input Unit 30

The configuration and the operation of the animation input unit 30 shown in FIG. 2 or 23 is not limited to the range shown in the above described FIGS. 28–32.

In the first embodiment of another animation input unit 30, a logical time is displayed along the time axis indicating the sequence of animation display units shown in FIG. 32. A user inputs the sequence of animation display units using the above described square and the value indicating the logical time. Thus, a user can generate a scenario description wherein a display timing of an animation display unit displayed through each window is implicitly specified with the synchronization among animation display units retained. In the animation internal data obtained from the animation internal data storing file 14 by interpreting a scenario description with the scenario description interpreter 12 shown in FIG. 2 or 23, the display timing of each animation display unit can be set as starting time data and ending time data in the "animation display unit" structure shown in FIG. 12, for example.

Figure 33:
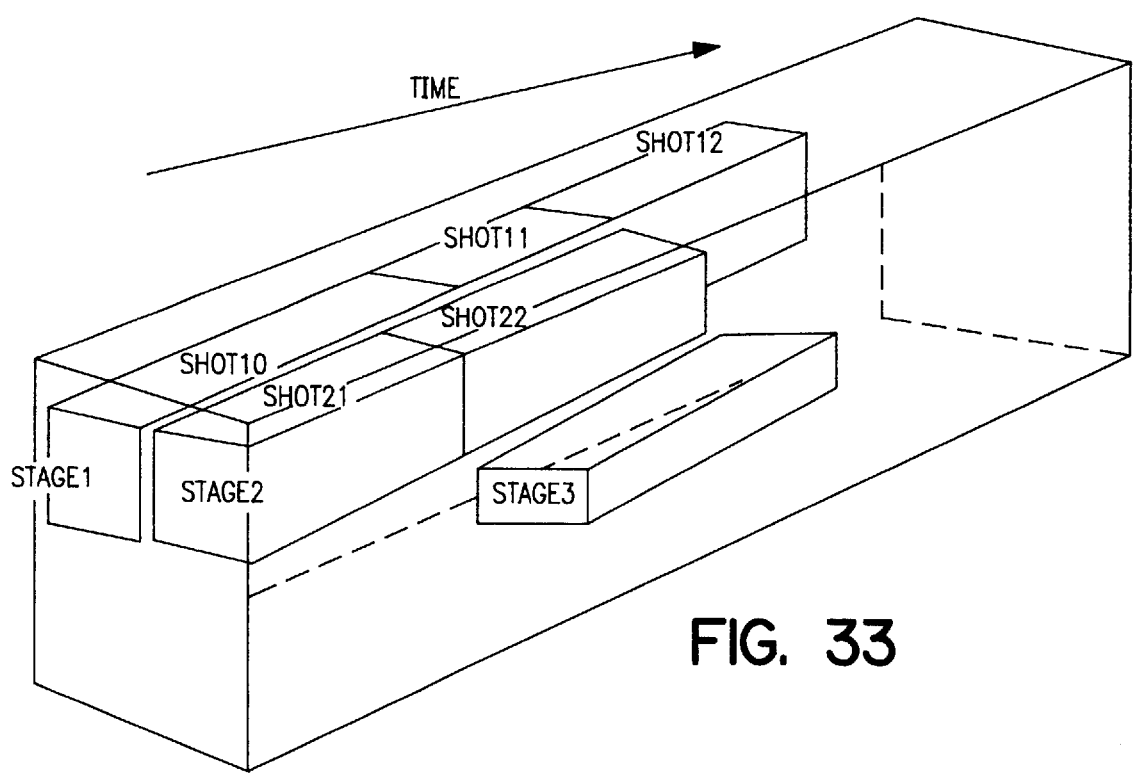
FIG. 33 is a view for explaining an editing screen of a window in the rectangular parallelepiped representation.

In the second embodiment of another animation input unit 30, as shown in FIG. 33, a rectangular parallelepiped is connected to another in the direction of the time axis, each being formed of a plurality of display screen slices arranged one after another along the time axis. The user can specify and edit the position, size, display timing, etc. of a window assigned to each rectangular parallelepiped.

As a result, the user can generate a scenario description containing the description for controlling a window. The state of each animation display unit is edited on an editing screen as shown in FIG. 32, according to which a scenario description corresponding to each editing operation is generated. In the animation internal data obtained from the animation internal data storing file 14 by interpreting a scenario description with the scenario description interpreter 12 shown in FIG. 2 or 23, the display time of each window is set as opening time data and closing time data of a "window" structure shown in FIG. 12.

Figure 34A:
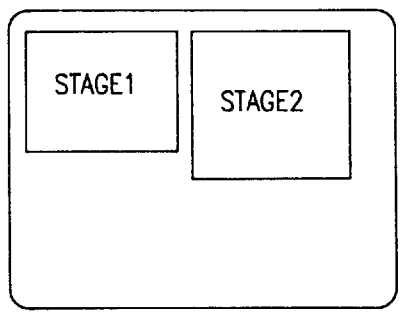
FIGS. 34a and 34b are views for explaining an editing screen of a window in a two-dimensional screen representation.
Figure 34B:
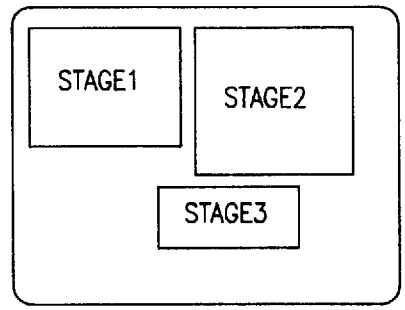

In the third embodiment of another animation input unit 30, as shown in FIG. 34a and 34b, areas "A", "B" respectively, etc. for inputting the area and logical time of a two-dimensional window screen are displayed on the graphic editor. In these areas, a user can specify and edit the position, size, and display timing. As a result, the user can generate a scenario description containing a description for controlling a window in the same manner as the second embodiment of another animation input unit 30. Then, the user edits for each state of a window the state of each animation display unit on an editing screen shown in FIG. 32 and generates a scenario description corresponding to each editing operation.

What is claimed is:

1. An animation display apparatus for simultaneously displaying a plurality of animation display units through a plurality of windows opened on a display, comprising:

animation display unit managing means for managing a plurality of different animation display units each comprising at least one frame for describing a screen display definition;

scenario description managing means for managing a plurality of scenario descriptions each respectively describing (1) a time and spatial state of each of a plurality of windows on a display, (2) a sequence-in-time-series among said plurality of different animation display units, and (3) a synchronization among said plurality of different animation display units, and said scenario description managing means for controlling (1) an opening and closing of said plurality of windows, (2) a position of said plurality of windows, (3) a display of said plurality of different animation display units in said plurality of windows, (4) a synchronization between said displayed plurality of different animation display units, and (5) a synchronization between said displayed plurality of windows; and animation display controlling means for interpreting one of said scenario descriptions managed by said scenario description managing means and for sequentially displaying time series data of said plurality of different animation display units simultaneously displayed through said plurality of windows according to said one interpreted scenario description.

2. An animation display apparatus according to claim 1, wherein said sequence-in-time-series includes a transit-in-time-series from an animation display unit to another animation display unit each displayed through a same window as, or a different window from, a window through which a former animation display unit is displayed.

3. An animation display apparatus according to claim 2, wherein said transit-in-time-series includes identification information effective when a user specifies a predetermined screen portion in a currently displayed animation display unit.

4. An animation display apparatus according to claim 2, comprising:

animation history managing means for managing a career of each animation display for said animation display units included in transit-in-time-series according to said transit-in-time-series, wherein said animation display controlling means further performs a backward display process of animation for said animation display units included in transit-in-time-series according to said transit-in-time-series displayed through each of said windows according to a history data managed by said animation history managing means.

5. An animation display apparatus according to claim 4, comprising:

operation mode control means for preventing a history managing function of said animation history managing means from operating in response to an instruction through a man-machine interface.

6. An animation display apparatus according to claim 1, wherein said scenario description includes group information indicating that a plurality of groups of said animation display units are processed as one animation display unit.

7. An animation display apparatus according to claim 1, comprising:

interface means for controlling an execution state of said animation display controlling means in response to an instruction through said man-machine interface.

8. An animation display apparatus according to claim 7, wherein said interface means includes a function for stopping an animation displaying process, a function for stepping forward and backward one animation display unit stopped by controlling said animation display controlling means, and a function for stepping forward and backward one frame contained in said animation display unit stopped by controlling said animation display controlling means.

9. An animation display apparatus for simultaneously displaying a plurality of animation display units through a plurality of windows opened on a display, comprising:

animation display unit managing means for managing a plurality of different animation display units each comprising at least one frame describing a screen display definition;

scenario description managing means for managing a plurality of scenario descriptions each respectively describing (1) a time and spatial state of each of a plurality of windows on a display, (2) a sequence-in-time-series among said plurality of different animation display units, and (3) a synchronization among said plurality of different animation display units, and said scenario description managing means for controlling (1) an opening and closing of said plurality of windows, (2) a position of said plurality of windows, (3) a display of said plurality of different animation display units in said plurality of windows, (4) a synchronization between said displayed plurality of different animation display units; and (5) a synchronization between said displayed plurality of windows;

animation display controlling means for interpreting one of said scenario descriptions managed by said scenario description managing means and for sequentially displaying time series data of said plurality of different animation display units simultaneously displayed through said plurality of windows according to said one interpreted scenario description; and scenario description editing means for editing one of said scenario descriptions managed by said scenario description managing means in an editing process including a graphic symbol editing process.

10. An animation display apparatus according to claim 9, wherein said scenario description editing means edits in a text format a position of each window currently displaying animation through an editing window opened on a display in an editing process, and edits in a graphic format using a graphic symbol, a sequence-in-time-series of said animation display units or a synchronization among animation display units displayed through each of said windows.

11. An animation display apparatus according to claim 10, wherein said scenario description editing means edits through an editing window in the text format a display timing of said animation display units displayed through each window currently displaying animation.

12. An animation display apparatus according to claim 10, wherein said scenario description editing means edits a timing of opening or closing and position of each window currently displaying animation in a rectangular parallelepiped representation in which a display screen having editing windows is set in a three-dimensional figure in a time axis direction.

13. An animation display apparatus according to claim 10, wherein said scenario description editing means edits in the text format through an editing window opened on a display in an editing process an opening or closing timing of each window currently displaying animation, and edits a position of each window on a display by positioning each of said windows in a predetermined area through an editing window.

* * * * *

UNITED STATES PATENT AND TRADEMARK OFFICE
CERTIFICATE OF CORRECTION

PATENT NO. : 5,856,830
DATED : January 5, 1999
INVENTOR(S) : Rieko Yamamoto

Figure 12A:
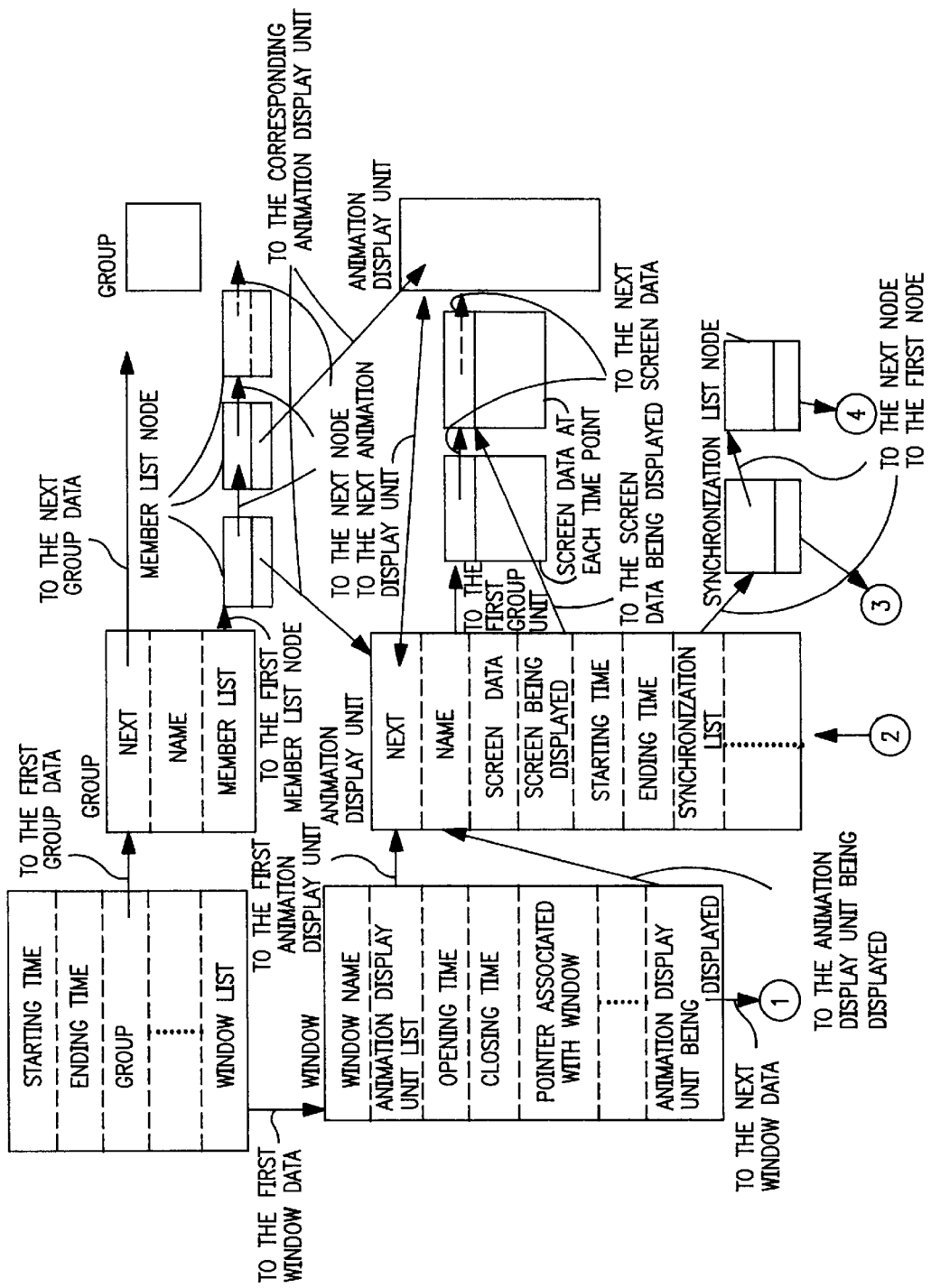
FIG. 12 is a view for explaining an embodiment of generated animation internal data.
Figure 12B:
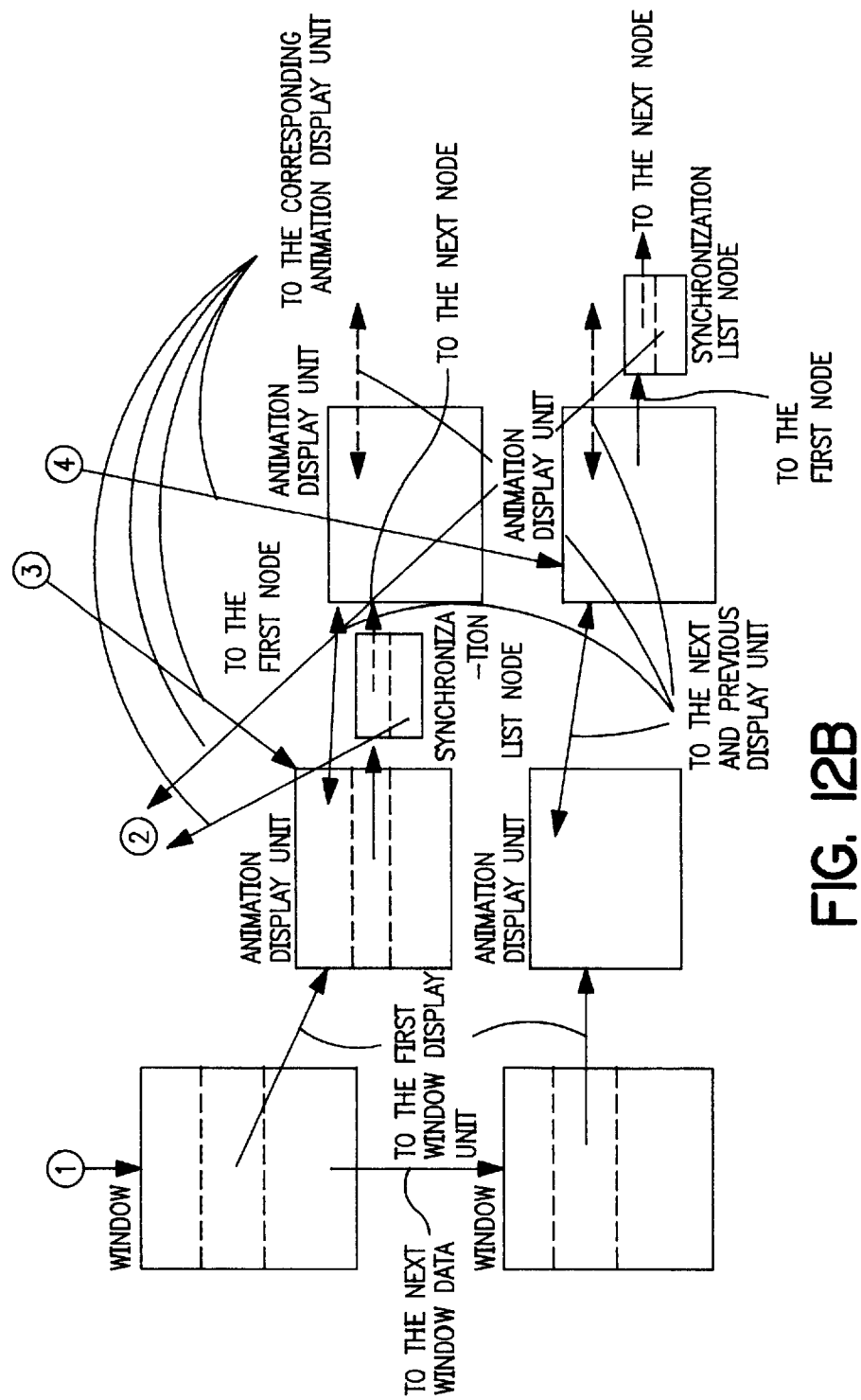

It is certified that error appears in the above-identified patent and that said Letters Patent is hereby corrected as shown below:

Column 2, line 64, change "FIG. 12" to --FIG. 12A and 12B--.

Figure 26A:
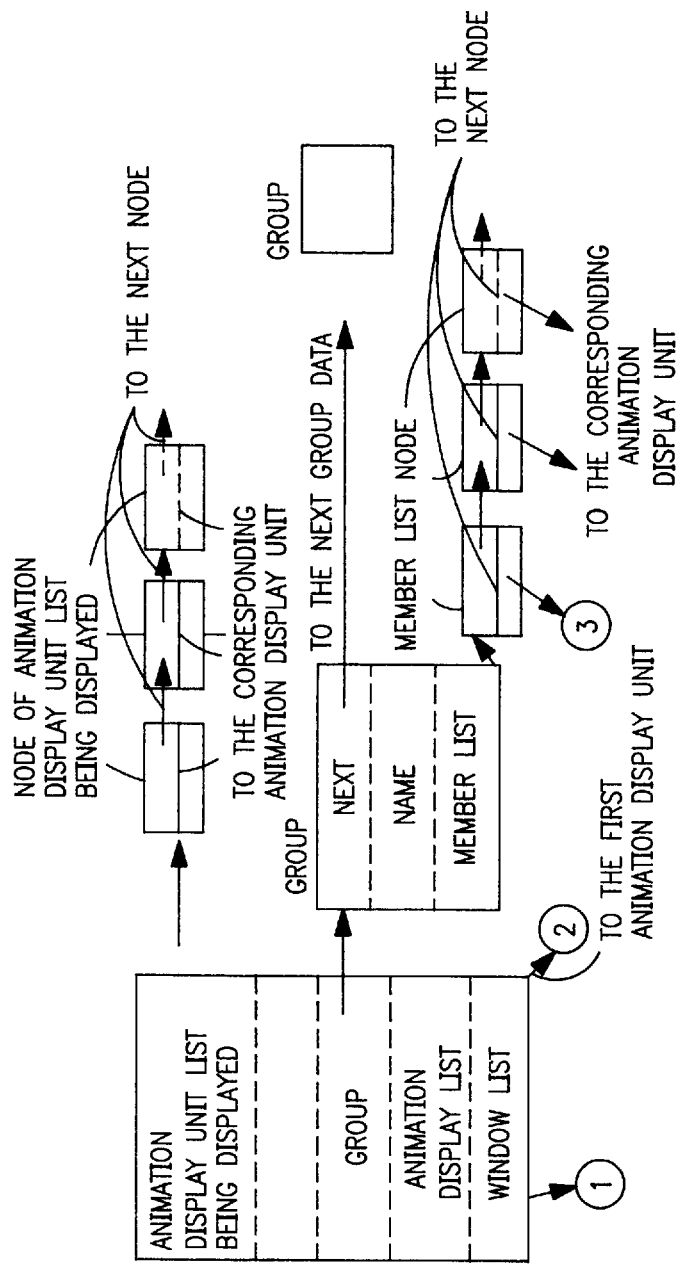
FIG. 26 is a view for explaining an embodiment of generated animation internal data.
Figure 26B:
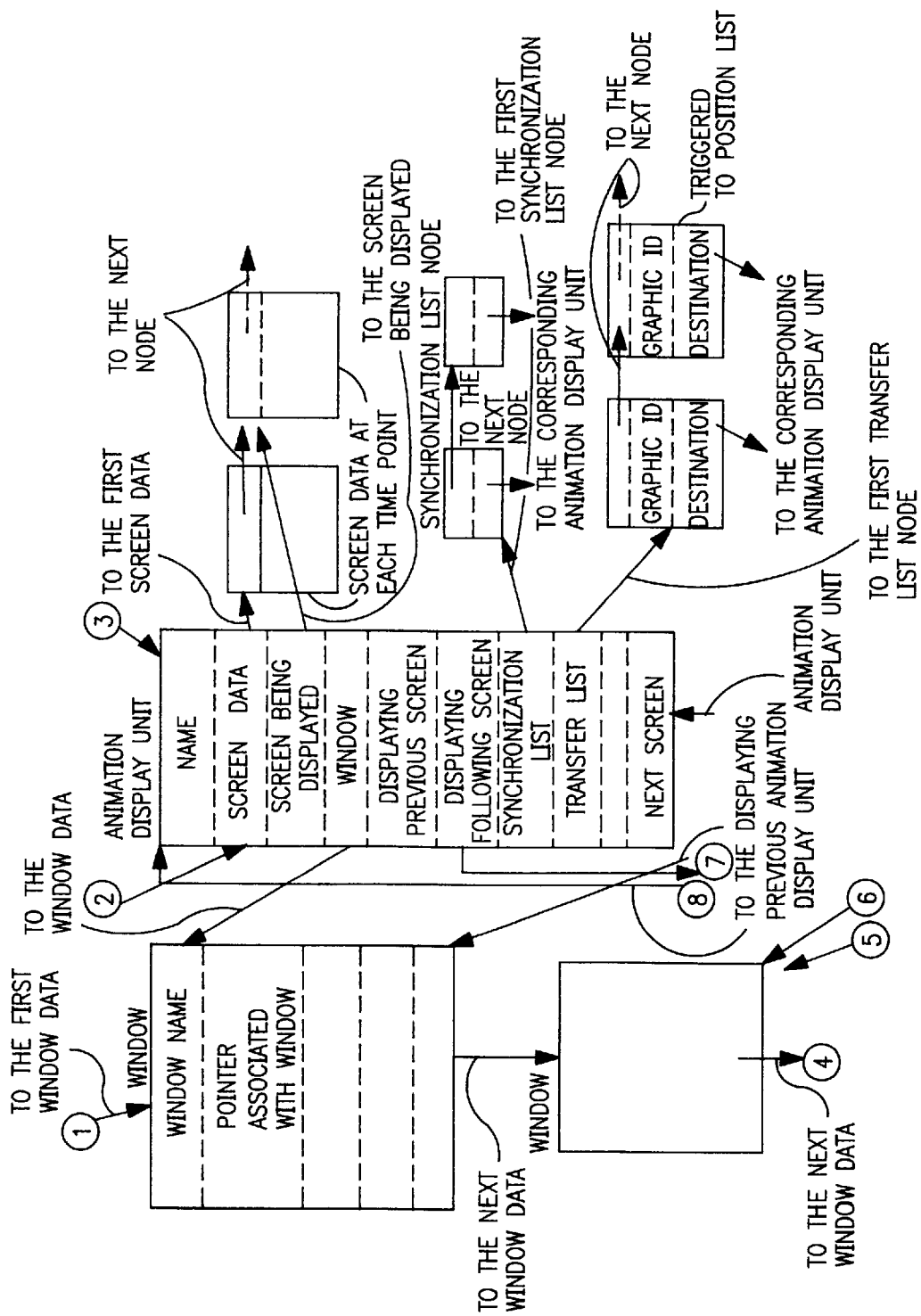
Figure 26C:
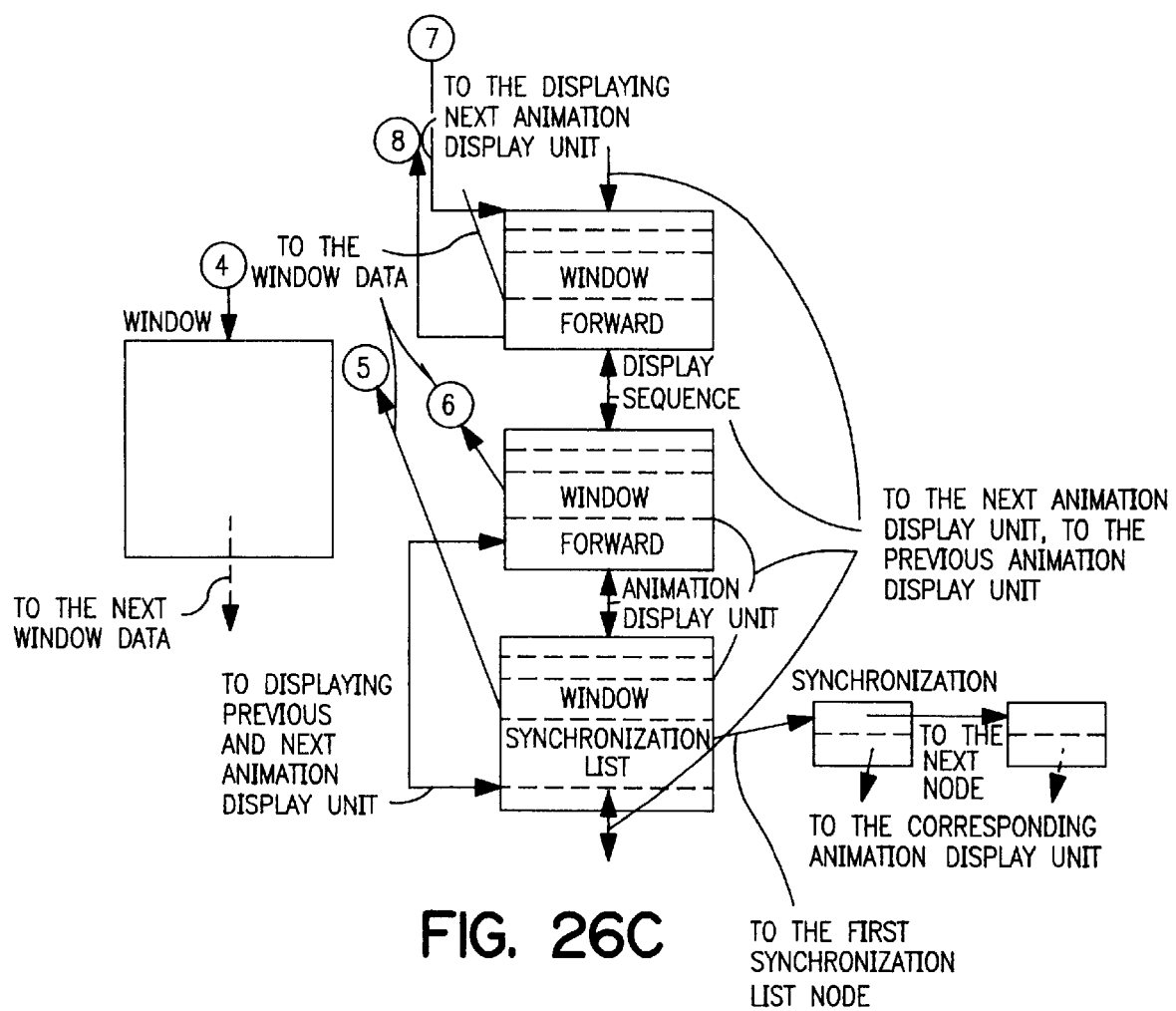

Column 3, line 10, change "FIG. 26" to --FIG. 26A, 26B and 26C--.

Column 10, line 7, change "FIG. 12 shows" to --FIG. 12A and 12B show--.

Column 10, line 25, change "FIG." to --FIGS.--.

Column 10, line 34, change "FIG." to --FIGS.--.

Column 11, line 24, change "FIG." to --FIGS.--.

UNITED STATES PATENT AND TRADEMARK OFFICE
CERTIFICATE OF CORRECTION

PATENT NO. : 5,856,830
DATED : January 5, 1999
INVENTOR(S) : Rieko Yamamoto

It is certified that error appears in the above-identified patent and that said Letters Patent is hereby corrected as shown below:

Column 14, lines 35 and 36, change "(shown in FIG. 26)" to --(shown in FIG. 26A, 26B and 26C )--.

Column 16, line 66, change "FIG." to --FIGS.--.

Column 17, line 18, change "FIG." to --FIGS.--.

Signed and Sealed this

Second Day of March, 1999

Attest:

Q. TODD DICKINSON

*Attesting Officer*                    Acting Commissioner of Patents and Trademarks